United States Patent [19]

Riley

[11] Patent Number: 4,984,521
[45] Date of Patent: Jan. 15, 1991

[54] CONVEYOR CONTROL

[75] Inventor: Ron Riley, Grand Blanc, Mich.

[73] Assignee: J. N. Fauver Company, Inc., Madison Heights, Mich.

[21] Appl. No.: 28,793

[22] Filed: Mar. 23, 1987

[51] Int. Cl.$^5$ .............. B60L 13/00; B60L 15/00
[52] U.S. Cl. .................. 104/290; 104/295; 104/299; 246/34 R; 246/182 C
[58] Field of Search .............. 318/580, 593, 594; 105/148; 104/299–303, 88, 89, 290, 295, 93; 246/63 R, 28 R, 34 R, 182 C

[56] References Cited

U.S. PATENT DOCUMENTS

| 3,312,818 | 4/1967 | Staples | 104/300 X |
|---|---|---|---|
| 3,650,216 | 3/1972 | Harwick et al. | 104/166 |
| 3,661,092 | 5/1972 | Morley et al. | 104/148 |
| 3,771,463 | 11/1973 | Smoot et al. | 104/155 |
| 3,792,665 | 2/1974 | Nelson | 104/299 X |
| 3,823,673 | 7/1974 | Wesener | 104/148 |
| 3,973,746 | 8/1976 | Ball | 104/299 X |
| 4,007,897 | 2/1977 | Auer, Jr. | 246/187 |
| 4,172,423 | 10/1979 | Monne | 105/148 X |
| 4,345,522 | 8/1982 | Miyamoto et al. | 104/299 X |
| 4,683,835 | 8/1987 | Moskowitz | 105/148 |

Primary Examiner—Robert J. Oberleitner
Attorney, Agent, or Firm—Reising, Ethington, Barnard, Perry & Milton

[57] ABSTRACT

The invention is a conveyor control system having self-propelled vehicles having wheels, each driven by a motor (14) to move along rails. The system includes power rails (18) for supplying power to the vehicle (12) and at least one command rail (20, 21) which transmits a constant command signal indicative of requested speed. The command rail (20) is comprised of isolated sections of rail for carrying different command signals along each isolated section to enable the vehicle (12) to travel at different speeds dependent on which section of rail the vehicle is within. The command signal may be in the form of an analog signal on one rail (20) or a digital signal on two rails (20, 21). Each vehicle (12) includes a control circuit (22) which interprets the command signal to drive the vehicle (12) at the requested speed. An override circuit (28, FIG. 2b, FIGS. 3 and 4) senses external activity for proper control of the circuit. The override circuit can slow down the vehicle (12) or stop the vehicle (12) when within a predetermined distance of another vehicle, or stop the vehicle (12) in response to a fault in the control circuit (22).

76 Claims, 10 Drawing Sheets

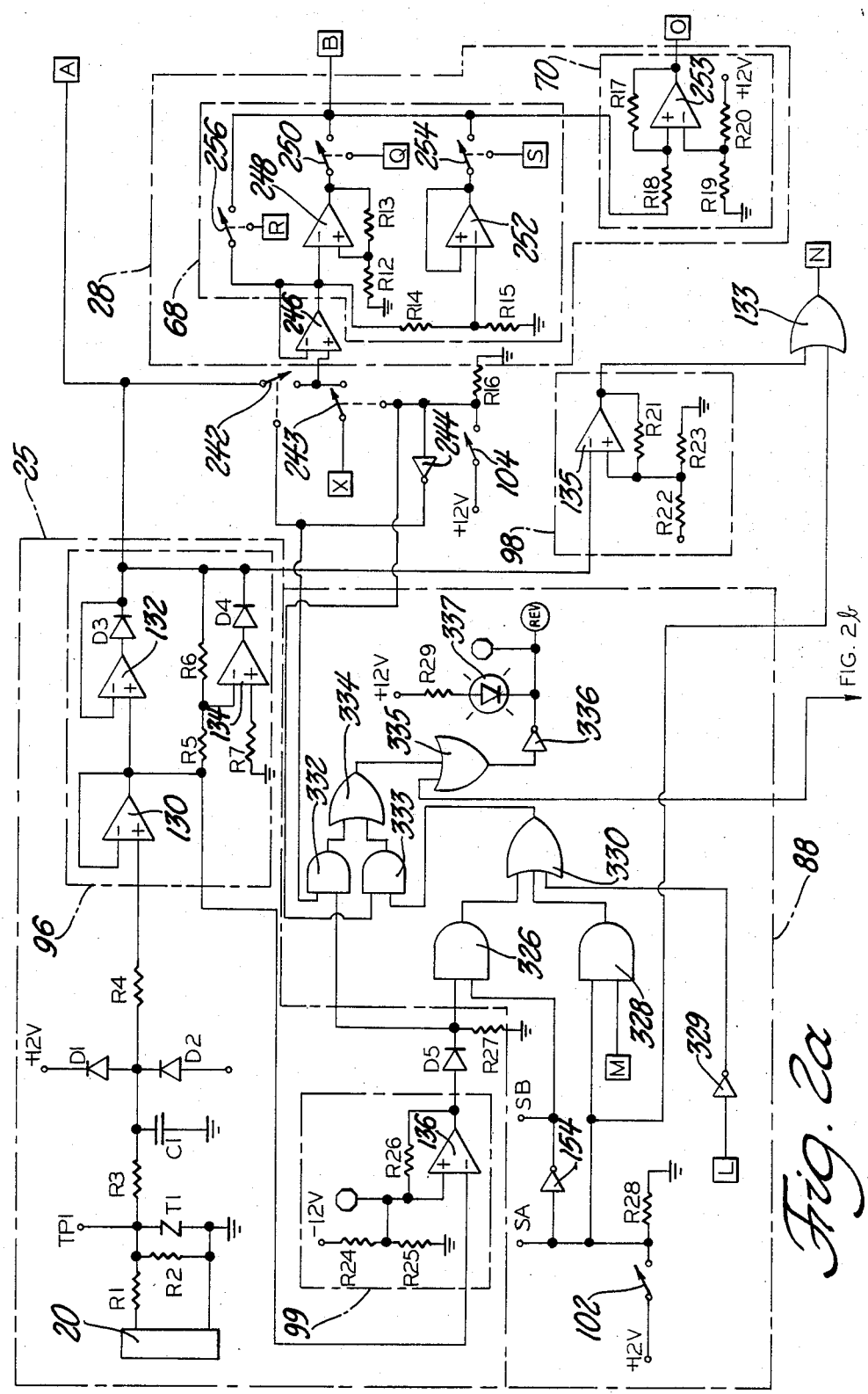

/ 1

CONVEYOR CONTROL

TECHNICAL FIELD

This invention relates to a conveyor control system having self-propelled vehicles which move along guide rails.

BACKGROUND ART

Conveyor control systems have in the past included chains running along the guide rails to which each trolley is connected. Speed is constant as is spacing between the vehicles. The problem with this type of assembly is that if the chain breaks down or one of the vehicles breaks down, the entire system is at a halt. Therefore, conveyor control systems are using vehicles which have a motor thereon to turn the wheels which receives power from power rails running along the guide rails. Each vehicle is self propelled so that if one of the vehicles breaks down, the vehicle can be removed without a total shut down of the conveyor system.

One such type of assembly includes self propelled vehicles having a drive motor supplied with power via current rail. The vehicles have contact elements extending out from their structures to open the circuit to slow or stop the vehicle when contact is made with another vehicle. A problem with this type of assembly is that the vehicles move at one speed and a collision is necessary before the motor is turned off. Such a system is disclosed in the U.S. Pat. No. 3,823,673 granted Jul. 16, 1974 in the name Erich Wesener which discloses a conveyor control system using vehicles containing a motor which are powered by current rails wherein a circuit is opened when contact occurs between two vehicles.

SUMMARY OF THE INVENTION AND ADVANTAGES

The invention is a conveyor control assembly which includes trolley vehicles which move along rails wherein the vehicles are powered from rail voltages. The assembly comprises a vehicle which includes wheels for mobility. A variable speed motor within the vehicle rotates the wheels. There are a plurality of rails which support the vehicle. The plurality of rails includes power rails for supplying power to the motor. The assembly is characterized by the plurality of rails including at least one command rail for producing a constant command signal along the command rail indicative of the requested speed. A control means within the vehicle receives the command signal and interprets it to drive the motor to move the vehicle at the requested speed.

The present invention improves the prior art by allowing for variable speed of the vehicle as directed by the command signal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2a-b is a schematic diagram of the analog speed selection means, the reversing means, and the command integration means;

DESCRIPTION OF THE PREFERRED EMBODIMENT

Figure 1:
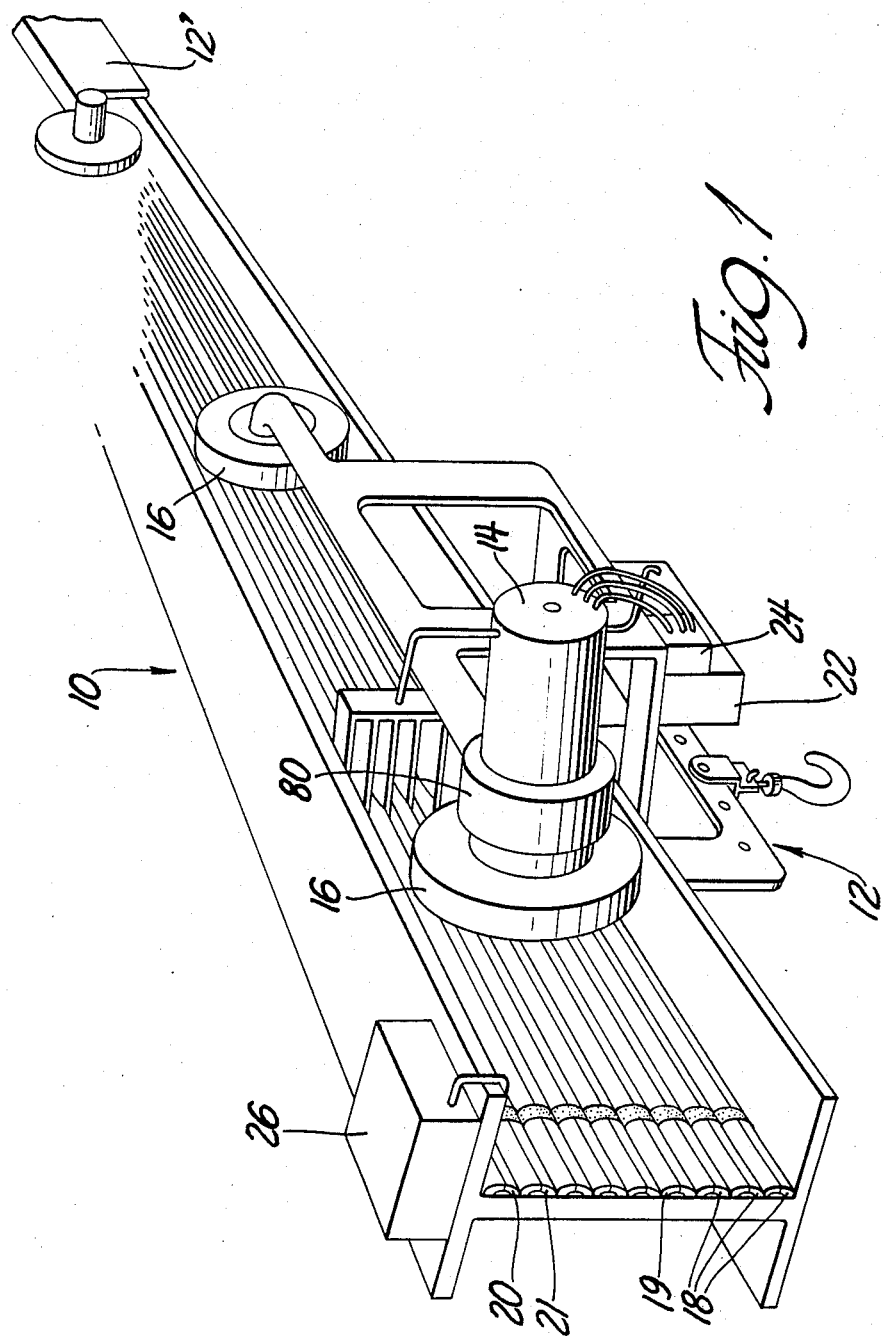
FIG. 1 is a perspective view of the preferred embodiment of the subject invention.

A conveyor control system which is powered from power rail voltages is generally shown at 10 in FIG. 1. The conveyor control assembly 10 includes a trolley vehicle 12 which has wheels 16 for mobility. The vehicle 12 has a variable speed motor 14 for rotating the wheels 16 to drive the vehicle 12 at variable speeds. The motor 14 is driven by three-phase a.c. power. The assembly includes a plurality of rails, at least one of which supports the vehicle 12. The plurality of rails includes power rails 18 for supplying power to the motor 14. The power supply rails 18 include three rails wherein each of the three rails 18 carry one phase of the power supply voltage. Also included is a ground rail 19. The plurality of rails includes at least one command rail 20 for producing a constant command signal along the command rail 20 which is indicative of requested speed. The command rail 20 comprises a plurality of isolated sections of rail 20 for providing one of the command signals by one of the sections of rails 20 as isolated from the command signal on the next adjacent section. The system 10 includes a control means 22, schematically shown in FIGS. 2-8, within the vehicle 12 which receives the command signal and interprets it to drive the motor 14 to move the vehicle 12 at the requested speed. The motor 14 includes an inverter 24 which drives the motor 14 from the control means 22. The control means 22 sends a d.c. signal to the inverter 24 of a standard type which uses the d.c. signal and the three phase power to modulate the width of pulses which drive the motor 14. The width of the pulse varies the power to the motor 14 which is synchronized to frequency making it a variable speed motor 14.

The assembly further includes generating means 26 which supply the command signal to the isolated sections of rail 20 to move the vehicle 12 at various speed. The command signal is one of a plurality of requested speeds which effectively drives the motor 14 at various speeds depending upon which of the isolated sections of rail 20 the vehicle 12 is within. The generating means 26 further includes a plurality of reverse and forward directional speeds which moves the vehicle 12 in the reverse or forward direction along the plurality of rails 20 at one of the plurality of requested speeds. In other words, the vehicle 12 can move driven by the motor 14 at various speeds in the reverse or forward directions. The speed the vehicle 12 moves is dependent upon the command signal which is received from the isolated section of rail 20 upon which the vehicle 12 is located. The next isolated section of rail 20, within which the vehicle 12 is driven may have the requested speed set at a different speed at which the vehicle 12 is to be driven. As an example, the speed differences may be necessary when a vehicle 12 is going on a long straight section of track as opposed to a sharp turn in the track. In this case, a higher requested speed signal would be sent along the isolated section of rail 20 on the straight section of the rail 20 and the lower requested speed would be sent along the isolated section of rail 20 along the turn.

Figure 2B:
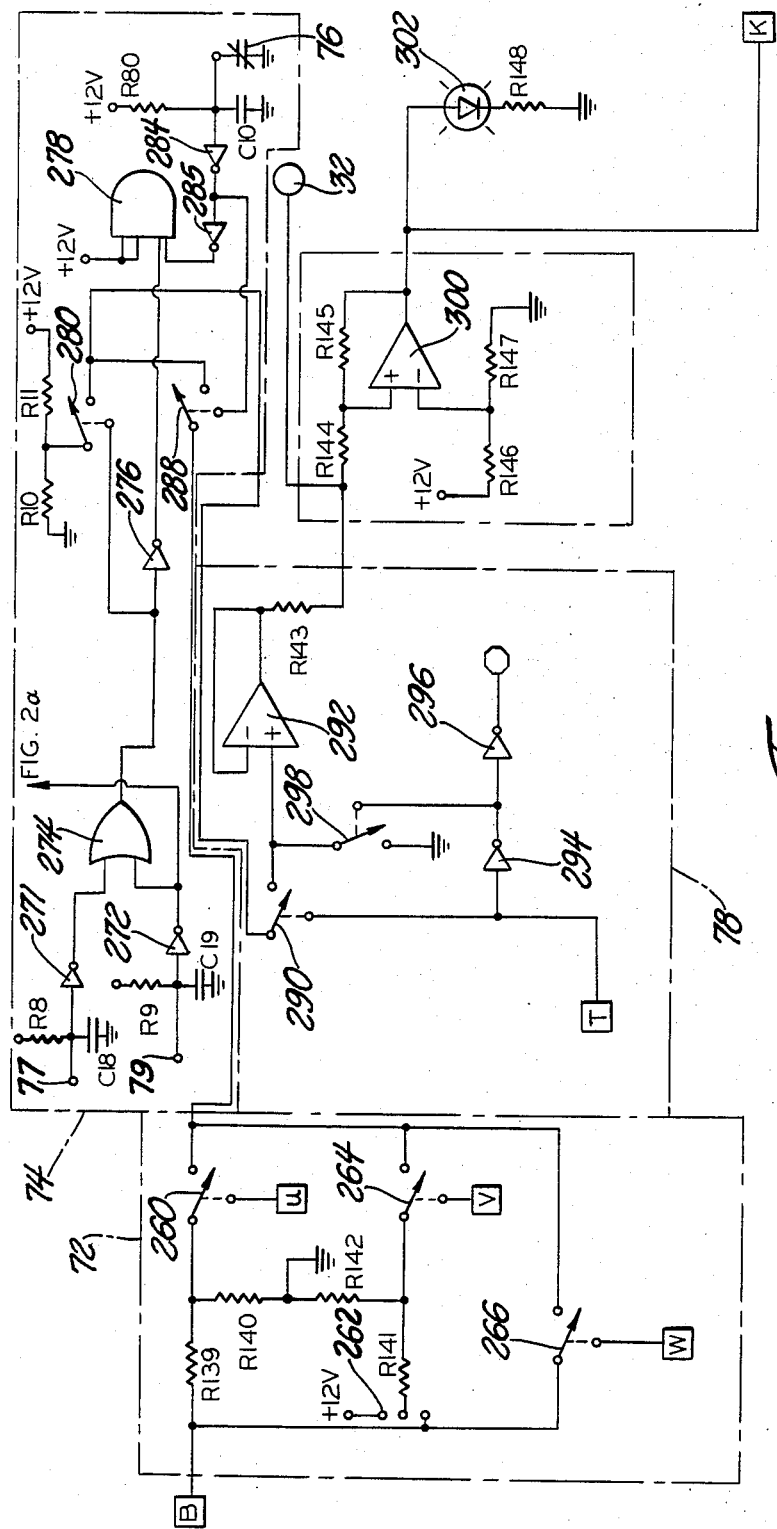
Figure 7:
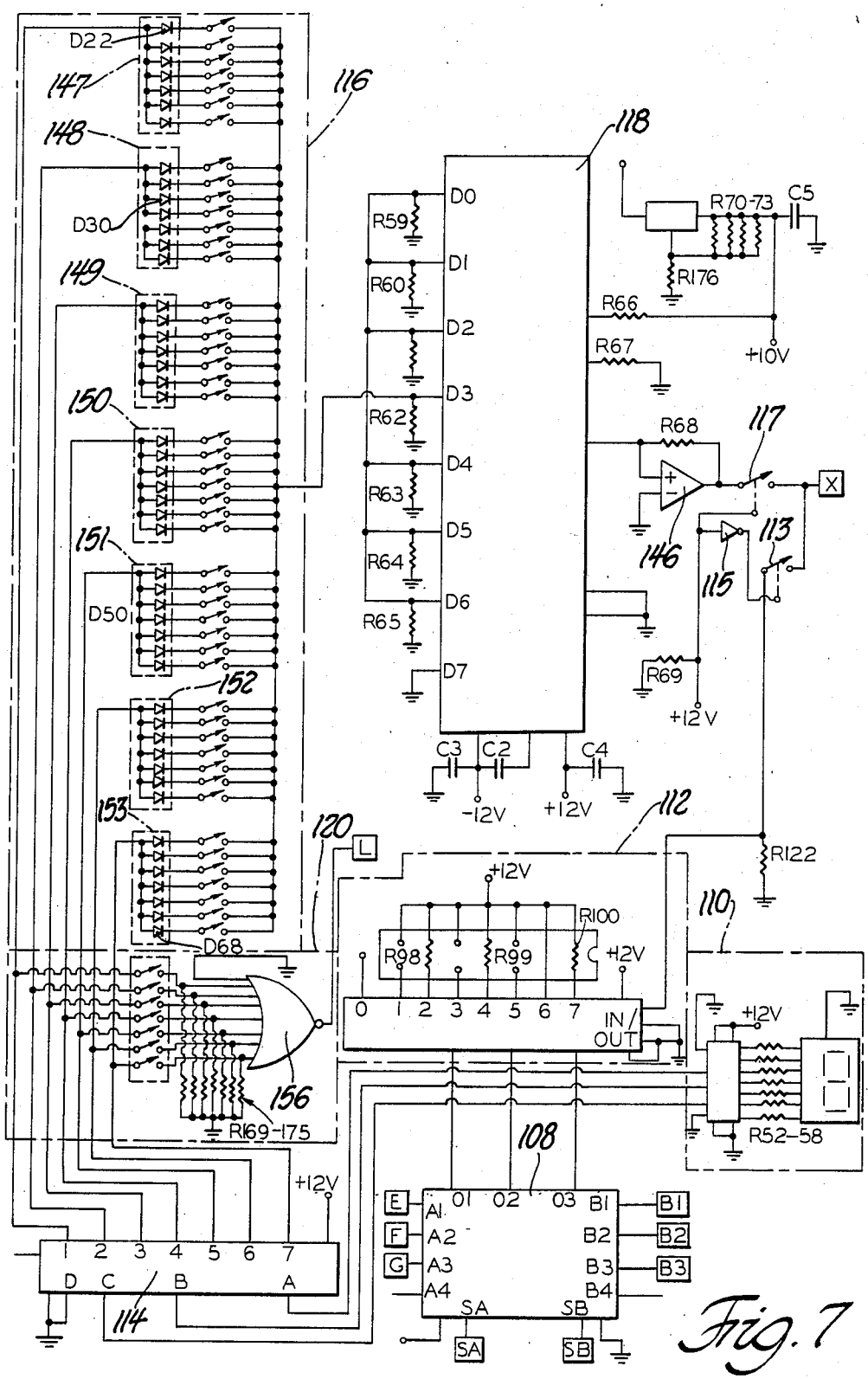
FIG. 7 is a schematic diagram of the decoding means.
Figure 8:
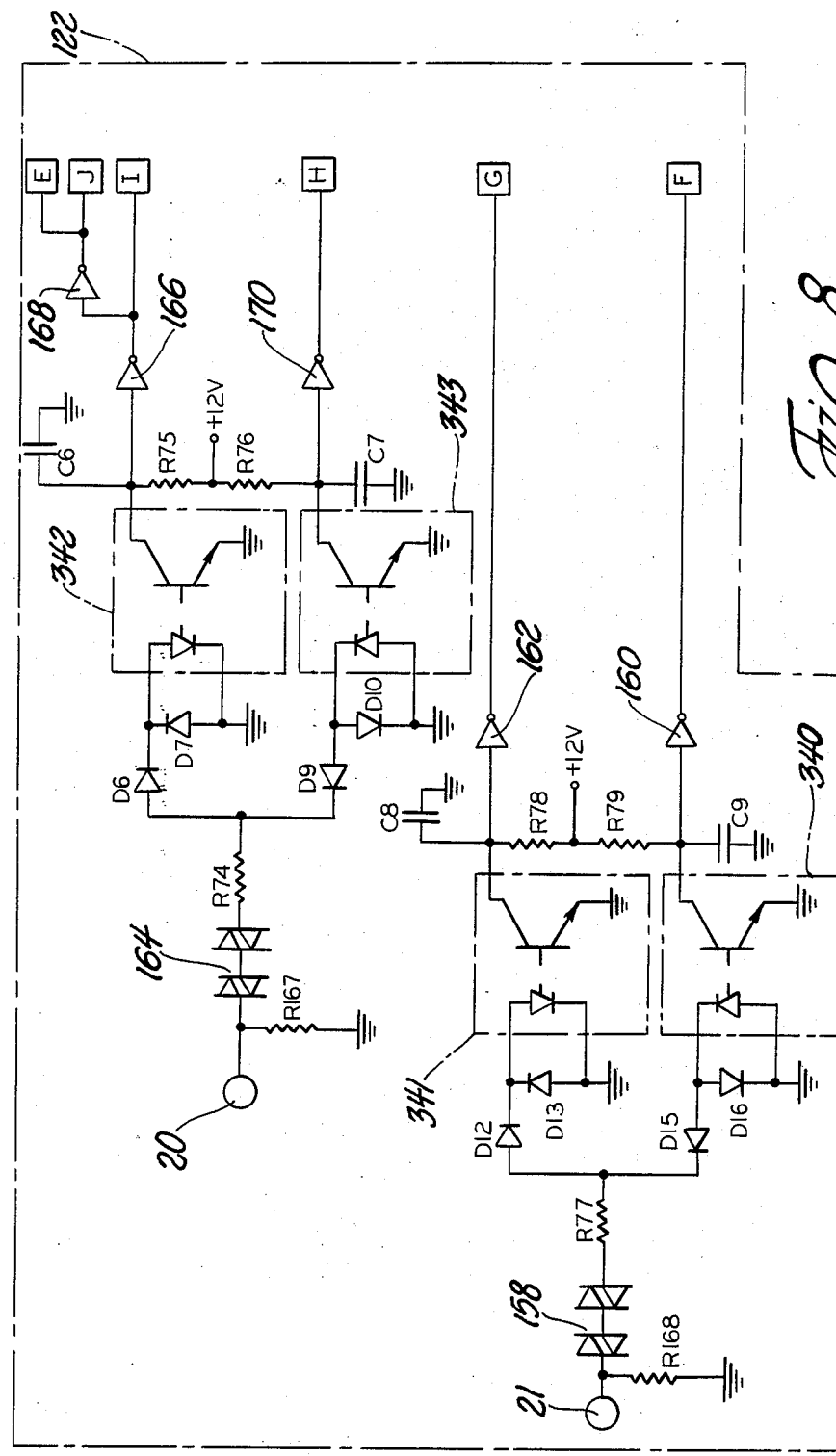
FIG. 8 is a schematic diagram of the digital rectifier means.
Figure 9:
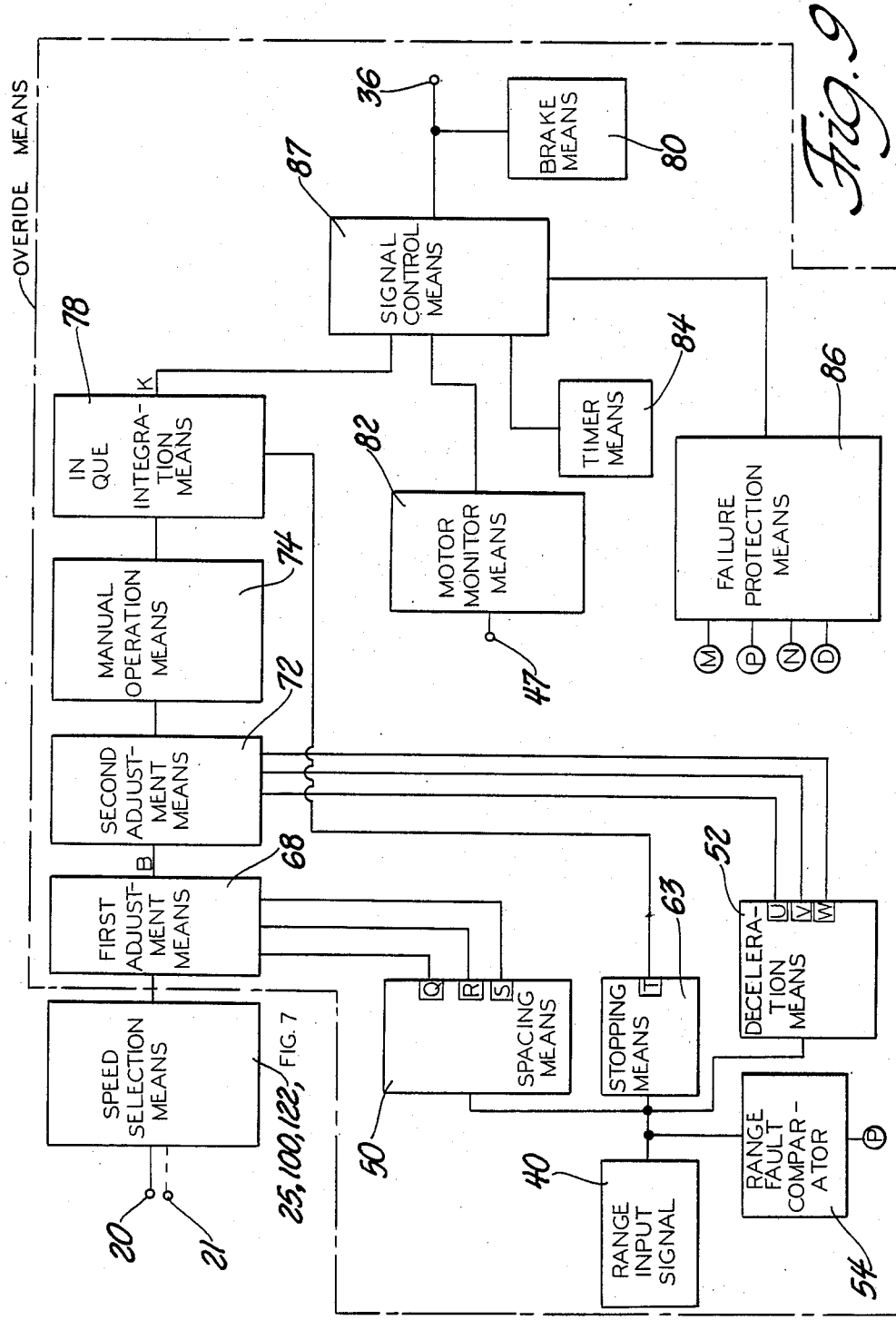
FIG. 9 is a block diagram of the subject invention.

For overall operation, the control means 22 further includes speed selection means 25 (in FIG. 2a), 100 (in FIG. 6), 122 (In FIG. 8), FIG. 7 which interprets the requested speed from the command signal to produce a speed select signal indicative of the requested speed. The control means 22 includes override means 28, FIG. 2b, FIGS. 3-4 for overriding and changing the command signal to drive the motor 14. The override means 28, FIG. 2b, FIGS. 3-4 includes command integration means 68, FIG. 2b, FIG. 4 and run integration means FIG. 3. The command integration means 68, FIG. 2b, FIG. 4 is for adjusting the speed select signal to produce a drive signal 32 to be supplied to the inverter 24 to adjust the speed of the vehicle 12. The run integration means FIG. 3 is for turning on and off the motor 14 through a run signal 36 to determine if it will accept the drive signal 32.

Figure 3:
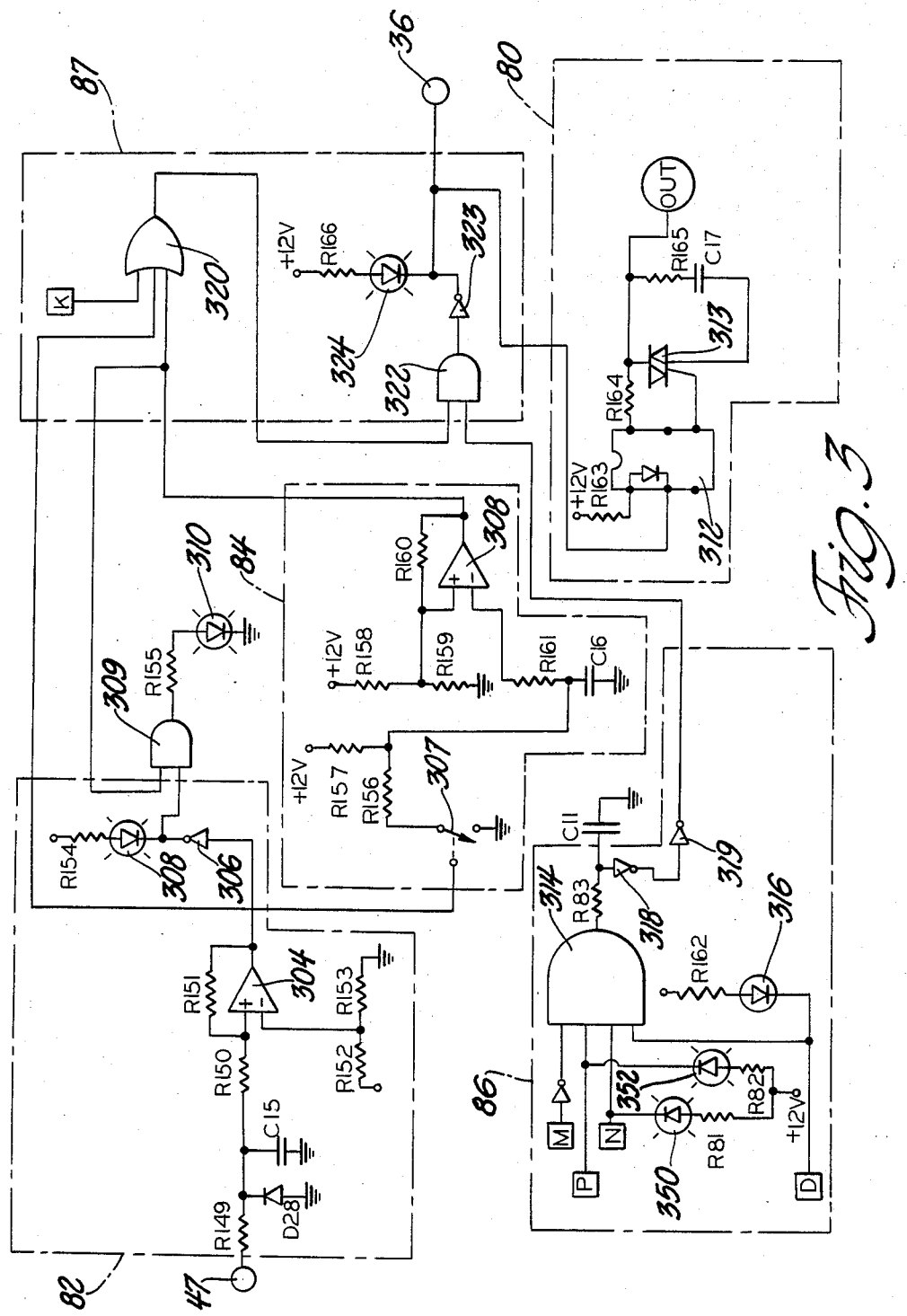
FIG. 3 is a schematic diagram of the run integration means.
Figure 4:
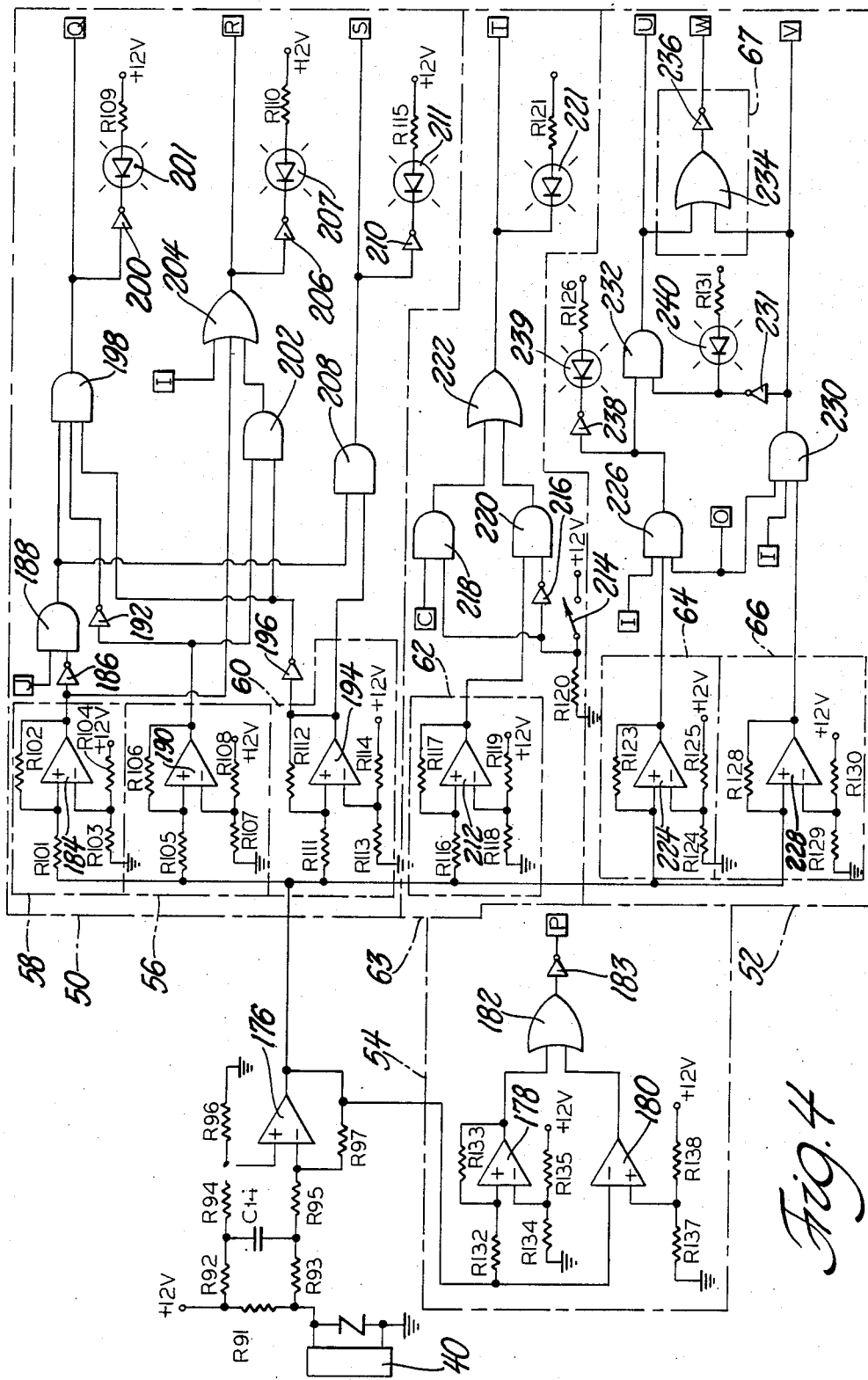
FIG. 4 is a schematic diagram of the tracking means.
Figure 5:
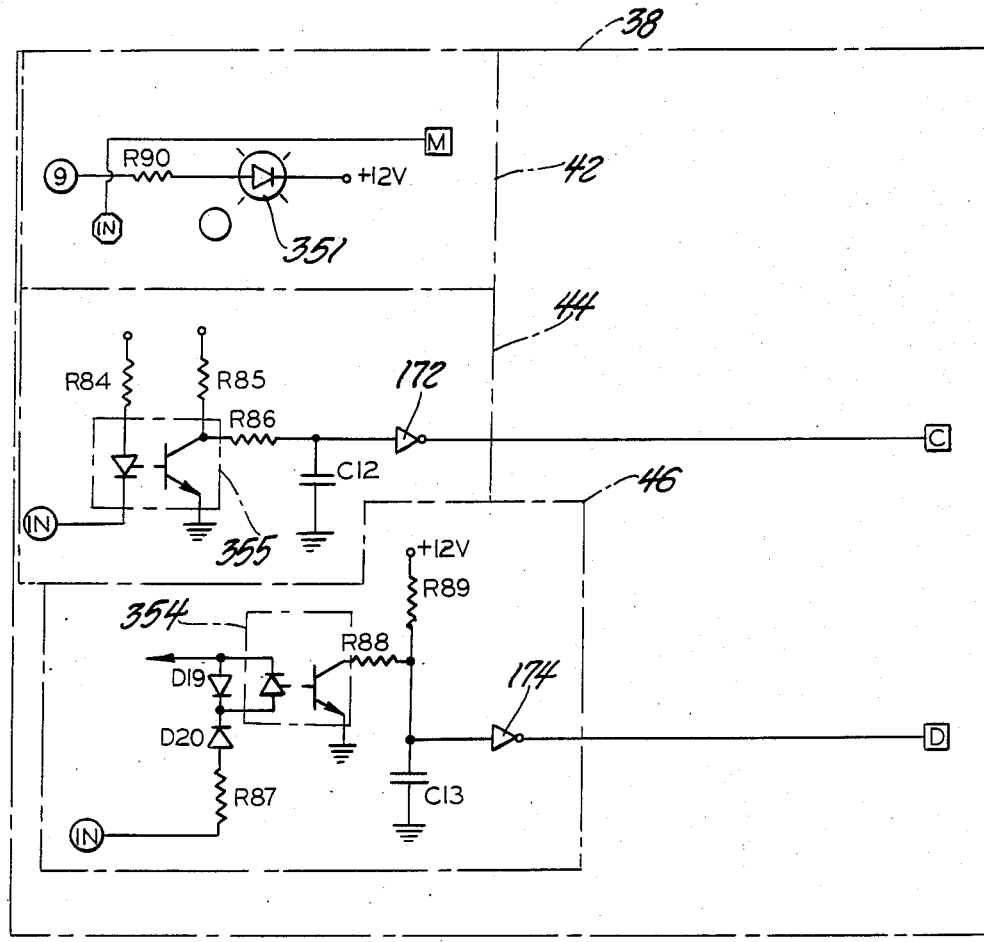
FIG. 5 is a schematic diagram of part of the input means.
Figure 6:
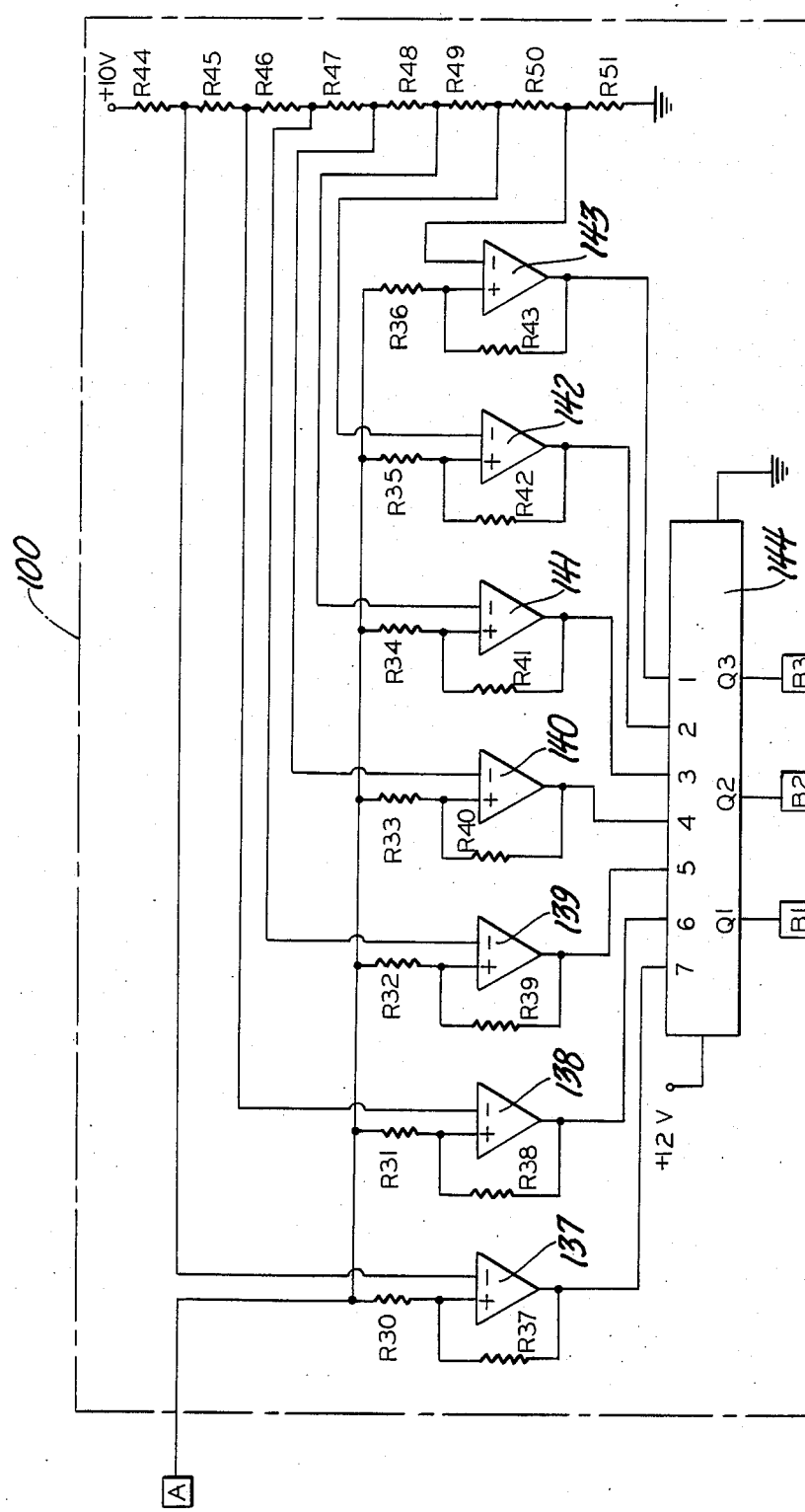
FIG. 6 is a schematic diagram of the converting means.

The override means 28, FIG. 2b, FIGS. 3-4 includes sensor input means 38, 40, 47 for sensing external activity for proper operation of the control means 22. The sensor input means 38, 40, 47 includes a range sensor input signal 40 which measures the distance to an adjacent vehicle. The input means includes a trip input 42, an in que input 44, an overload input 46, and a motor monitor input signal 47. The trip input 42 monitors the temperature on heat sinks inside the drive and produces a trip input signal (M). The temperature rises and can overheat when the monitor demands more power than the drive can give, i.e., increased load or duty cycle. The in que input 44 is a short range sensor which produces an in que input signal (C) to stop a vehicle 12 to prevent an immediate collision. The in que sensor 44 is optically isolated with a ten millisecond time constant. It is actuated by opening the circuit which is tied to interface common or by the que comparator 62 in the stopping means 63, explained subsequently. The overload input 46 is a switch in the windings of the motor 14 for sensing overheating of the motor 14 and produces an overload input signal (D). The motor monitor input signal 47 senses the speed the motor 14 is turning at and moving the vehicle 12.

The command integration means 68, FIG. 2b, FIG. 4 includes tracking means FIG. 4 which prevents collisions by maintaining spacing of the vehicles 12. The tracking means FIG. 4 includes spacing means 50 for maintaining a predetermined distance between vehicles 12 so that a first vehicle 12 will run at the requested speed and an adjacent trailing vehicle will vary its speed to maintain the predetermined distance. The tracking means FIG. 4 also includes deceleration means 52 for slowing the vehicle 12 by a variable percentage to prevent a collision and for running the vehicle 12 at the requested speed unless the vehicle 12 senses another vehicle within at least one forward predetermined distance. Therefore, the override means 28, FIG. 2b, FIGS. 3-4 may control the speed of the vehicles 12 as a total dependency on a first vehicle 12 by continuously maintaining a predetermined distance between vehicles 12, or each vehicle 12 can run independently until within a forward predetermined distance of another vehicle.

If the range sensor input signal 40 is less than a specified magnitude, for example 4 mA, or greater than a second specified magnitude, such as 20 mA, then a fault will be detected through a range fault comparator 54 producing a range fault signal (P). The range fault comparator 54 which activates the range fault signal (P) indicates that the range input signal 40 is below an allowed amount and therefore there is a fault on the input. This is an electrical fault within the sensor or line.

The spacing means 50 uses three comparing circuits which receive the range sensor input 40. The comparing circuits will determine if the vehicle 12 is to run at the requested speed or run at a speed greater than or less than the requested speed. The percentages of the greater or less than can be varied by component values used. For example, the comparing circuits may increase or decrease the speed of the vehicle 12 by ten percent for a time period in order for the vehicle 12 to resume to the predetermined distance. A lagging comparator 56 is set when the vehicle 12 is lagging in the predetermined distance which causes to be produced a positive adjustment signal (Q) to increase the speed by the programmed percentage. A leading comparator 60 is set when the vehicle 12 is leading on the predetermined distance and causes to be produced a negative adjustment signal (S) to decrease the speed by the programmed percentage. A base comparator 58 detects whether a vehicle 12 is within the field at all. A base signal (R) is produced to indicate that no vehicle 12 is present in order to act as the lead vehicle 12 and run at the requested speed. The leading 56 and lagging comparators 60 are active only when the enable spacing input (J) is activated, which will be described subsequently. The spacing means 50 can only be activated when using a digital input rail as will also be explained subsequently.

Also included is a stopping means 63 which produces a stop signal (T) for stopping the vehicle 12 when another vehicle 12 is within a stop distance which is less than the distances required to activate the spacing means 50 and deceleration means 52. The stopping means is activated by the in que input signal (C) or range sensor input signal 40, wherein the motor monitor means 82 applies the brake. This is a short distance monitor which will quickly slow the vehicle 12 and apply the brake to prevent collision and further damage. The stopping means 63 uses a que comparator 62 to receive the range sensor 40 and produce the stopping signal (T) when within the stop distance. This stopping means 63 is always active.

The deceleration means 52 uses two comparing circuits for producing a DECEL1 or DECEL2 signal when the vehicle 12 is within a first or second forward predetermined distance. The deceleration means 52 is a long range sensor. If a DECEL1 signal (U) is produced the vehicle 12 will be slowed by a first percentage. If a DECEL2 signal (Y) is produced, the vehicle 12 will be slowed by a second percentage or to a user programmed rate. The deceleration means 52 will prevent collision by slowing a vehicle 12 down and will prevent congestion by keeping the minimum forward distance between consecutive vehicles. The deceleration means 52 includes a first deceleration comparator 64 for producing the DECEL1 signal (U) to lower the speed of the vehicle 12 when approaching another vehicle 12. This function is active if the requested speed is greater than or equal to the user programmed level, activated by the deceleration enable signal (O) explained subsequently. When it is activated, it drops the speed to a user specified percentage of the requested speed. The deceleration means 52 also includes a second deceleration comparator 66 for producing the DECEL2 signal (Y) when approaching another vehicle 12 and is active when the requested speed is greater than or equal to the user programmed level. Either mode is active until the complemented enable spacing input (R) is activated. A deceleration gate 67 is activated to produce a NO DECEL signal (W) when either the DECEL1 or DECEL2 signals are inactive. The NO DECEL signal (W) will not change the speed select signal and the vehicle 12 will pass absent a change in the speed by the deceleration means 52.

The command integration means 68, FIG. 2b, FIG. 4 includes adjustment means 68, 72 for adjusting said requested speed in response to the tracking means FIG. 4. The adjustment means includes first adjustment means 68 producing a first adjusted signal (B) for adjusting the drive signal 32 representative of requested speed to the motor 14 by adding and substracting magnitudes from the speed select signal in response to the spacing means 50. Therefore, the first adjustment means 68 will either increase or decrease the speed of the vehicle 12 by the first or second programmed percentages or allow the vehicle 12 to run at the base speed. The first adjustment means 68 is directly controlled by the spacing means 50.

The deceleration enable signal (O) will be set by a deceleration comparator means 70 when the output of the first adjustment means 68 is below a programmed amount. Even though the deceleration enable signal (O) is set, activation of the deceleration means 52 depends on whether the enable spacing signal (J), or in other words spacing means 50 is activated.

The command integration means 68, FIG. 2b, FIG. 4 includes second adjustment means 72 for receiving the first adjusted signal (B) and producing a second adjusted signal for changing the speed of the vehicle 12 by the first and second percentages or setting the speed of the vehicle 12 to a user programmed rate in response to the deceleration means 52. If the NO DECEL signal (W) was received from the deceleration means 52 then there is no adjustment to the first adjusted signal (B). The first (B) and second adjusted signals may be equal to the speed select signal if no changes in the signal occurred within the first 68 and second 72 adjustment means. A jumper 262 selects one of two modes responsive to the first deceleration comparator 64. When the first mode is selected, the speed of the vehicle 12 is dropped to a user specified percentage. When the second mode is selected, the speed of the vehicle 12 is dropped to a user specified percentage of the requested speed or a fixed user programmed rate.

The command integration means 68, FIG. 2b, FIG. 4 includes a manual operation means 74 option. The vehicle 12 may be jogged forward or backward by switching the command integration means 68, FIG. 2b, FIG. 4 through a manual switch 76 and then manually applying a signal at the forward 77 or reverse terminal 79. Each input 77, 79 is activated by the tieing it to logic common. If the manual operation means 74 is not activated, there is no change to the second adjusted signal coming from the second adjustment means 72.

The command integration means 68, FIG. 2b, FIG. 4 includes an in que integration means 78 which receives the in que signal (T) from the tracking means FIG. 4 and the signal from the manual operation means 74 and will drop the speed select signal to approximately 0 Volts when the in que signal (T) is activated in order to stop the vehicle 12 to prevent a collision. The output of the in que integration means 78 provides the drive signal 32 to the motor 14. This signal indicates the exact speed that the motor 14 is to presently run at.

The run integration means FIG. 3 includes braking means 80 for stopping the vehicle 12. The braking means 80 will stop the vehicle 12 to prevent a collision in emergencies. Also included is motor monitor means 82 for dynamically braking the vehicle 12 when the speed of the motor 14 falls below a predetermined speed. In other words, the motor monitor means 82 monitors the motor 14 and when the motor voltage indicated by the motor monitor input 47 falls below a voltage indicative of the predetermined speed, such as 0.4 volts, the brake 80 is actuated to stop the vehicle 12. The relay to the brake 80 is continuously energized to keep the brake 80 open, so that de-energization will actuate the brake 80. A timer means 84 will hold the initiation of the brake 80 for a predetermined time between zero and 30 seconds at which point the run signal is turned off and the brake 80 is applied. The timer means 84 ensures that the brake 80 is not applied when also driving the motor 14. The run integration means FIG. 3 includes timer means 84 for delaying actuation of the brake 80 until a predetermined time following the motor monitor 82 going to zero, representing movement. Dynamic breaking is accomplished by applying a dc current to the motor windings at which oppose turning.

The run integration means FIG. 3 further includes failure protection means 86 for stopping the vehicle 12 in response to a failure in the control means 22 or from the sensor input means 38, 40, 47. The failure protection means 86 receives the range fault signal (P) of the tracking means FIG. 4, the trip input signal (M), a command fault signal (N), and the overload input signal (D). The command fault signal (N) indicates that a command signal below a voltage indicative of a command has been received, or in other words, there is no command signal on the rail 20, as will be described subsequently.

The run integration means FIG. 3 also includes signal control means 87 for OR-ing the drive signal 32, motor monitor means signal and timing means signal to produce a command run signal. The command run signal is combined with the failure protection means signal, and when either signal goes low, an OFF run signal 36 is generated. Only, when both signals are high will the run signal 36 remain ON.

Therefore, as long as the motor 14 is active, and there is a drive signal 32, and the failure protection means 86 has not been activated, the run integration means FIG. 3 will produce a run signal 36 indicating the motor 14 is to be ON. If the drive signal 32 and the motor monitor means signal 47 after the timer means 84 has delayed indicate no movement of the vehicle 12, then the run signal 36 will turn OFF the motor 14. If in any case the failure protection means 86 is active, the motor 14 will be turned OFF.

The control means 22 also includes reversing means 88 for receiving the command signal and producing a reversing signal 90 when the command signal is negative. The reversing means 88 checks for a reverse command signal and ensures that no forward signals are being sent to the first adjustment means 68.

In overall performance, the command integration means 68, FIG. 2b, FIG. 4 receives the speed select signal for use in the first and second adjustment means 68, 72 which is controlled by the tracking means FIG. 4 which produces the adjusted signal. The command integration means 68, FIG. 2b, FIG. 4 first receives the adjusted signal from the first 68 and second 72 adjustment means. The command integration means 68, FIG. 2b, FIG. 4 then incorporates the in que input signal (T) from the tracking means FIG. 4 to produce the drive signal 32 indicative of the speed the vehicle 12 is to move at. This drive signal 32 is sent to the inverter 24. The drive signal 32, the motor monitor means signal 82, and the timer means 84 signal 84 are incorporated with the failure protection means signal 86 in the run integration means FIG. 3. The run integration means FIG. 3 results in the run signal 36 and the brake drive 80 actuation if necessary.

The drive signal 32 drives the motor 14 and is indicative of the speed the vehicle 12 is to move at. The speed is no longer a mirror image of the requested speed, though it may be. The presence of other vehicles and safety measures can alter the requested signal to the command signal. The run signal 36 either turns the motor ON or OFF. Therefore, both the drive signal 32 and run signal 36 need both be present in order for the vehicle 12 to move. Just before the run signal 36 is turned OFF, dynamic braking is used to eliminate wear on the braking means 80. When the drive signal 32 goes to zero, the drive is stopped. The motor monitor input signal 47 will be set as the motor 14 slows to below the predetermined magnitude. At that point, the timer means 84 is actuated after which the run signal 36 is turned OFF.

There are three embodiments of the speed selection means 25, 100, 122, FIG. 7 which incorporate the conveyor control assembly. The first embodiment 25 uses a pure analog signal sent along a single rail 20 for driving the motor 14. The second embodiment 25, 100, FIG. 7 uses an analog signal sent along one rail 20 but which is then converted to a digital signal for determining speed and decoded back to an analog signal to drive the motor 14. The third embodiment 122, FIG. 7 of the conveyor control system includes a digital signal which is sent along two command rails 20, 21 for determining speed which is then converted to an analog signal to drive the motor 14. All of the input lines include a time delay, i.e. 10 msec, to prevent erroneous signals from entering the control means 22.

The first embodiment of the speed selection means 25 is characterized by the generating means 26 generating an analog command signal sent on one command rail 20 with a magnitude indicative of the requested speed analog. The command signal is then rectified by an analog rectifying means 96 for determining a forward or reverse signal. The working range is 1-24 Vdc. An analog fault means 98 determines if the command signal is less than 0.5 V and in this case a fault is indicated which is the command fault signal (N). A positive command over the user programmed threshold, such as the 0.5 V, moves the vehicle 12 forward, and vice versa for the negative signal. The output of the analog rectifier means 96 is the speed select signal. The speed select signal is then sent to the first adjustment means 68 at which point the signals of the three embodiments 25, 100, 122, FIG. 7 come together, the first adjustment means 68 was explained prior. If the command signal is negative, an analog reversing means 99 receives the negative signal and produces an analog reversing signal which is sent to the reversing means 88 to send a reversing signal 90. The first embodiment may access the spacing means 50 as long as it accepts the complemented (I) and enable spacing signal (J) from one digital input rail 21 otherwise only the stopping means 63 and the deceleration means 52 of the tracking means FIG. 4 may be enabled.

The speed selection means 25 of the first embodiment includes a first analog circuit resistor R1 connected to the input which receives the command signal, a second analog circuit resistor R2 and a analog circuit transient absorber V1 in parallel and connected to the first analog circuit resistor R1, a third analog circuit resistor R3 connected to the analog circuit transient absorber T1, a first analog circuit capacitor C1 connected between the third analog circuit resistor R3 and ground, first D1 and second D2 analog circuit diodes connected to the first analog circuit capacitor C1 and to a positive and negative power supply, and a fourth analog circuit resistor R4 connected to the analog circuit pair of diodes, D1, D2. The rectifying means 96 includes a first analog circuit operational amplifier 130 with noninverting input connected to the fourth analog circuit resistor R4 and inverting unity gain feedback, a second analog circuit operational amplifier 132 with noninverting input connected to the output of the first analog circuit operational amplifier 130, a third analog circuit diode D3 connected to the output of the second analog circuit operational amplifier 132 having feedback from the output of the third analog circuit diode D3, a fifth analog circuit resistor R5 connected to the output of the first analog circuit operational amplifier 130, a third analog circuit operational amplifier 134 with inverting input connected to the fifth analog circuit resistor R5, a fourth analog circuit diode D4 connected to the output of the third analog circuit operational amplifier 134, a sixth analog circuit resistor R6 connected to the inverting input of the third analog circuit operational amplifier 134 and the fourth analog circuit diode D4 as feedback, and a seventh analog circuit resistor R7 connected between the noninverting input of the third analog circuit operational amplifier 134 and ground wherein the output of the second 132 and third 134 analog circuit amplifiers produce the speed select signal. The analog reversing means 99 includes a fourth analog circuit operational amplifier 136 as a comparator with inverting input connected to the output of the first analog circuit operational amplifier 130, eighth R24 and ninth R25 analog circuit resistors comprising a voltage divider for the non-inverting input of the fourth analog circuit operational amplifier 136, an analog circuit feedback resistor R26 connected to the non-inverting input as feedback to the fourth analog circuit operational amplifier 136, a fifth analog circuit diode D5 connected to the output of the fourth analog circuit operational amplifier 136, a tenth analog circuit resistor R27 connected to the fifth analog circuit diode D5 and ground producing the analog reversing signal.

The analog fault means 98 includes an analog fault operational amplifier 135 for receiving the speed select signal from the analog rectifier means 96 at the inverting input, a first R22 and second R23 analog fault resistor configured as a voltage divider connected to the non-inverting input, a third analog fault resistor R21 connected to the non-inverting input as feedback, and a command fault OR gate 133 receiving the output of the analog fault op-amp 135 and producing the command fault signal (N).

The second embodiment of the speed selection means 25, 100, FIG. 7 uses and converts the analog speed select signal (A) from the analog rectifier means 96 of the first embodiment 25. The speed selection means 25, 100, FIG. 7 includes converting means 100 for converting the analog speed select signal (A) into a digital signal representative of the requested speed. The analog speed select signal (A) is converted to a three bit binary code B1, B2, B3. In this mode, one of seven digitally set speeds are realized through the three bit binary code B1, B2, B3 determined in the converting means 100, as follows:

| Speed 1 | 6.0 V | Speed 6 | 16.0 V |
|---|---|---|---|
| Speed 2 | 8.0 V | Speed 7 | 18.0 V |
| Speed 3 | 10.0 V | OFF | .5–4.5 V |
| Speed 4 | 12.0 V | Fault | .5 V |
| Speed 5 | 14.0 V | | |

This mode is selected by turning on the system digital switch 102 and turning on the analog-digital switch 104. The speed selection means 25, 100, FIG. 7 further includes decoding means FIG. 7 for decoding the three bit binary coded signal B1, B2, B3 which produces the speed select signal (X) representative of the requested speed. The three bit binary code B1, B2, B3 is sent to a multiplexer 108 which selects which code to use, whether from the second 25, 100, FIG. 7 or third embodiment 122, FIG. 7. The selection is determined by the system digital switch 102 located in the reversing means 88. The three bit output 01, 02, 03 is received by a display means 110 which displays the speed. The three bit output 01, 02, 03 may be interpreted through an analog multiplexer 112 or through a binary to decimal decoder 114. In the case of the analog multiplexer 112, the analog multiplexer 112 receives the three bit output 01, 02, 03 and dependent on the coding, will output an analog speed select signal (X), the speed of which is determined by external resistors R98, R99, R100, only which three are shown which would represent three possible speeds. The second interpretation is through the binary to decimal decoder 114. The binary to decimal decoder 114 receives the three bit output 01, 02, 03 producing a seven bit output. Speed switches 116 receive the seven bit output to determine the requested speed, one of seven possible speeds. The speed switches 116 can set the speed of each of the particular switches, 147, 148, 149, 150, 151, 152, 153, by setting the number of internal switches. Diodes D22-D70 block unselected switches. A digital to analog converter 118 converts the signal from the speed switches 116 to the analog speed select signal (X) which is then switch selected into the first adjustment means 68 by the analog digital switch 104, as explained prior. A digital reversing means 120 senses the presence of a decoded reversing signal (L). The decoded reversing signal (L) is a one speed reverse. The reversing means 88 receives the decoded reversing signal (L). In this mode, the analog reversing signal is also received from the analog rectifier means 96 and either signal will move the vehicle 12 in the reverse direction. The analog speed select signal (X) is sent to the first adjustment means 68 when the analog digital switch 104 is closed, otherwise the first embodiment 25 speed select signal is used. The digital to analog converter 118 is a piggy back board. If the board 118 is connected, the decoding means FIG. 7 uses this digital to analog converter 118, but if the board is not connected the analog multiplexer 112 is used.

The converting means 100 includes seven parallel operational amplifiers 137, 138, 139, 140, 141, 142, 143 with each having one of seven input resistors R30, R31, R32, R33, R34, R35, R36 connected between the noninverting inputs and the output of the fourth analog circuit operational amplifier R136, one of seven feedback resistors R37, R38, R39, R40, R41, R42, R43 connected to the respective one of the seven input resistors R30, R31, R32, R33, R34, R35, R36 as noninverting feedback, a first converting means limiting resistor R44 connected between the power supply and the inverting input of the first 137 of the seven operational amplifiers, a second converting means limiting resistor R45 connected between the first converting means limiting resistor R44 and the inverting input of the second 138 of the seven operational amplifiers, a third converting means limiting resistor R46 connected between the second converting means limiting resistor R45 and the inverting input of the third 139 of the seven operational amplifiers, a fourth converting means R47 limiting resistor connected between the third converting means limiting resistor R46 and the inverting input of the fourth 140 of the seven operational amplifiers, a fifth converting means limiting resistor R48 connected between the fourth converting means limiting resistor R49 and the inverting input of the fifth 141 of the seven operational amplifiers, a sixth converting means limiting resistor R50 connected between the fifth converting means limiting resistor R49 and the inverting input of the sixth 142 of the seven operational amplifiers, a fifth converting means resistor R50 connected between the sixth converting means limiting resistor R49 and the inverting input of the seventh 143 of the seven operational amplifiers, a eighth converting means limiting resistor R51 connected to the seventh resistor R50 and ground, and a priority encoder 144 for receiving the output of the seven operational amplifiers 137, 138, 139, 140 141, 142, 143 to produce a three bit binary output B1, B2, B3.

The decoding means FIG. 7 includes the multiplexer 108 to receive the three bit binary output. An analog multiplexer 112 receives the output from the multiplexer 108, and the output is the analog speed select signal. The analog multiplexer 112 uses three decoding resistors R98, R99, R100 connected between a voltage supply and the analog multiplexer 112 and a short to one of the pins of the analog multiplexer 112. A fourth decoding resistor R122 is connected between the output and ground. A first decoding switch 113 connects the output of the analog multiplexer 112 to the output being the speed select signal (X). A decoding inverter 115 is connected to the voltage supply to control the closing of the first decoding switch 113, and a limiting decoding resistor R69 is connected to ground and the voltage supply line to the decoding inverter 115. The binary to decimal decoder 114 which receives the output from the multiplexer 108 produces a seven bit binary code and includes a series of seven speed switches 116 connected to the seven bit outputs for selecting one of seven speeds, a digital-to-analog converter 118 to receive one of the seven speeds selected, a series of seven resistors R59, R60, R61, R62, R63, R64, R65 each connected between ground and one of the inputs of the digital-to-analog converter 118, a decoding means operational amplifier 146 and a decoder feedback resistor R68 connected in noninverting feedback wherein the output of the decoding means operational amplifier 146 produces the speed select signal (X) connected through a second decoding switch 117. External connections to the digital to analog converter 118 include a first capacitor C4 connected to pin 13 and ground, a second and third capacitor C3, C2 connected to ground and pins 3 and 16 respectively, a first resistor R67 connected to pin 15, a second resistor R66 connected to pin 14 and a fourth capacitor C5 connected to the second resistor R66 and a series of parallel resistors R70, R71, R72, R73 connected to the fourth capacitor C5 and a third resistor R176 all connected to a chip type 7805 connected to the voltage supply. The multiplexer 108 includes select input lines which determine whether the bit inputs will come from the converting means 100 or the digital input of the third embodiment 29, explained subsequently. The display means 110 includes a decoder chip with the inputs from the multiplexer and each of seven outputs connected to seven resistors R52, R53, R54, R55, R56, R57, R58 and a digital display. Each speed select switch 147, 148, 149, 150, 151, 152, 153 includes seven diodes D22-70 for setting the voltage associated with each switch.

The system reversing means 88, as also explained subsequently, includes the digital selection switch 102 which when opened, and therefore not supplying voltage to the system reversing means 88, indicates that the second embodiment 27 of digital control through analog input is selected. The digital switch 102 is connected to a select inverter 154 which produces the signal indicating the second embodiment mode. If the switch 102 is closed, digital control through the digital input will be selected, and the select control signal is taken directly from the output of the switch 102, before the select inverter 154. Therefore, only one of the modes will be selected at a time.

The digital reversing means 120 includes a NOR GATE 156 to receive each of the seven bit binary outputs from the binary to decimal decoder 114 for producing the reversing signal. A series of seven resistors R169, R170, R171, R172, R173, R174, R175 are connected between the inputs and ground.

The third embodiment of the speed select means 122, FIG. 7 is characterized by the generating means 26 generating the digital command signal sent on two of the command rails 20, 21 producing a first and second rail command signal. The third embodiment 122, FIG. 7 includes a digital rectifier means 122 which receives the command signal off the digital rail 20, 21 wherein a first bit (E), the digital input reverse (H) signal, enable spacing signal (J) and the complemented enable spacing signal (I) are determined from the command signal on the first rail 20 and a second (F) and third (G) bit are determined from the second rail 21. The speed select means 122, FIG. 7 includes decoding means FIG. 7 for decoding the digital signal to the speed select signal representative of the requested speed. The decoding means FIG. 7 is identical to the decoding means FIG. 7 of the second embodiment 25, 100, FIG. 7 and will not be repeated here, except that the multiplexer 108 determines which of the three bit binary output the decoding means is to use, whether from the digital rectifier means 122 or from the convertor. The reversing means 88 uses the signal from the digital input reverse (H) or the digital reversing means 120 in the decoding means FIG. 7. The system digital switch 102 is turned on when digital control is used from the digital inputs.

The digital rectifier means 122 includes a first digital circuit resistor R168 connected to the second command signal input rail 21 and to ground, a first digital circuit diac 158 connected to the first digital circuit resistor R168, a second digital circuit resistor R77 connected to the first digital circuit diac 158, a first digital circuit diode D15 connected to the second digital circuit resistor R77 for passing the negative portion of the second command signal, a second digital circuit diode D16 connected to the first digital circuit diode D15 and ground, an third digital circuit diode D17 in parallel with the second digital circuit diode D16, a first phototransistor assembly 340 with the base optically connected to the third digital circuit diode D17, a third digital circuit resistor connected to the collector of the first phototransistor assembly 340, a first digital circuit capacitor C9 connected to the collector of the first photo-transistor assembly 340 and ground, a first digital circuit inverter 160 connected to the collector of the first photo-transistor Q1 whose output produces the second bit of a three bit binary output, a fourth digital circuit diode D12 connected to the second digital circuit resistor R77 for passing the positive portion of the first command signal, a fifth digital circuit diode D13 connected to the fourth digital circuit diode D12 and ground, a sixth digital circuit diode D14 connected in parallel with the fifth digital circuit diode D13, a second photo-transistor assembly 341 optically connected with the base to the sixth digital circuit diode D14, a fourth digital circuit resistor R78 connected to the collector of the second photo-transistor assembly 341, a second digital circuit capacitor C8 connected to the collector of the second phototransistor assembly 341 a second digital circuit inverter 162 connected to the collector of the second photo-transistor assembly 341 wherein the output is the third bit (G) of the three bit binary output, a fifth digital circuit resistor R167 connected to the first command signal input rail 20, a second digital circuit diac 164 connected to the fifth digital circuit resistor R167, a sixth digital circuit resistor R74 connected to the second digital diac 164 a seventh digital circuit diode D6 connected to the sixth digital circuit resistor R74 for passing the positive portion of the first command signal an eighth digital circuit diode D7 connected to the seventh digital circuit diode D6, a ninth digital circuit diode D8 in parallel with the eighth digital circuit diode D7, a third photo-transistor Q3 optically connected to the ninth digital circuit diode D7, a sixth digital circuit resistor R75 connected to the collector of the third phototransistor Q3, a third capacitor C6 connected to the collector of the third photo-transistor assembly 342 and ground, and a third digital circuit inverter 166 connected to the third photo-transistor assembly 342, and a fourth digital circuit inverter 168 whose output is the first bit (E) of the three bit binary output.

The digital reversing means 120 of the third embodiment is identical to the digital reversing means 120 of the second embodiment, that signal coming from the decoding means FIG. 7. The third embodiment 29 has the digital reversing signal input (H) determined from the input of the first rail 20. The circuitry for producing the digital reversing signal input (H) includes a tenth digital circuit diode D9 connected to the sixth digital circuit resistor R74 of the rectifier means 92 passing the negative portion of the first command signal an eleventh digital circuit diode D10 connected to the tenth digital circuit diode D9, a twelfth digital circuit diode D11 in parallel with the eleventh digital circuit diode D10, a fourth photo-transistor assembly 373 optically connected to the twelfth digital circuit diode D11, a seventh digital circuit resistor R76 connected to the collector of the fourth photo-transistor assembly 373, a fourth digital circuit capacitor C7 connected to the collector and a fifth digital circuit inverter 170 connected to the collector producing the digital reversing signal input (H).

As common to all the embodiments, the enable spacing (J) and complemented enable spacing (I) signals are also produced from the first rail 20. The enable spacing is produced by the fourth digital circuit inverter 168, as is the first bit (E). The complemented enable spacing (I) is produced by the third digital circuit inverter 166.

The in que input 44 includes a first input diode D24 connected to the in que input 44 sensor, a first input resistor R84 connected to the first input diode D24, a first input photo-transistor assembly 244 with the base optically connected to the first input diode D24, a second input resistor R85 connected to the collector of the first input photo-transistor assembly 244, a third input resistor R86 connected to the collector of the first input photo-transistor assembly 244, a first input capacitor C12 connected to the third input resistor R86 and ground, a first input inverter 172 connected to the third input resistor R86 producing the in que input signal (C). The overload input 46 includes a fourth input resistor R87 connected to the overload input sensor 46, a second input diode D26 connected to the fourth input resistor R87, a third input diode D25 connected to the second input diode D26, a fourth input diode D27 connected in parallel to the third input diode D25, a second input phototransistor assembly 245 with the base optically connected to the fourth input diode D27, an fifth input resistor R88 connected to the collector of the second input photo-transistor assembly 245, a sixth input resistor R89 connected to the fifth input resistor R88 and the voltage supply, a second input capacitor C13 connected to the fifth input resistor R88 and ground, a second input inverter 174 connected to the fifth input resistor R88 for producing an overload signal (D). The trip input signal (M) is connected directly to the trip input 42.

The tracking means FIG. 4 includes a range sensor transient depressor V2 on the range input, a first R91 and second R93 tracking circuit (TC) resistor connected to the range sensor 40 transient suppressor, a third TC resistor R92 connected to the first TC resistor R91, a first TC capacitor connected between the third TC resistor R92 and the second TC resistor R93, a fourth TC resistor R95 connected to junction of the first TC capacitor and the second TC resistor R93, a fifth TC resistor R94 connected to the junction between the third TC resistor R92 and the first TC capacitor, a first TC operational amplifier 176 with inverting input connected to the fourth TC resistor R95 and noninverting input connected to the fifth TC resistor R94, a sixth TC resistor R96 connected to the non-inverting input of the first TC operational amplifier 176 and ground and a seventh resistor R97 as feedback connected to the inverting input. The range fault comparator 54 includes an eighth TC resistor R132 connected to the output of the first TC operational amplifier 176, a second TC operational amplifier 178 with non-inverting input connected to the eighth TC resistor T132, a ninth R134 and tenth R135 TC resistor as a voltage divider connected to the inverting input of the second TC operational amplifier 178, an eleventh TC resistor R133 connected to the non-inverting input as feedback, a twelfth TC resistor R136 connected to the output of the first TC operational amplifier 176, a third TC operational amplifier 180 with non-inverting input connected the twelfth TC resistor R136, a thirteenth R137 and fourteenth R138 TC resistors configured as a voltage divider connected to the inverting input of the second TC operational amplifier 178, a first OR 182 gate for receiving the outputs of the second 178 and the third 180 TC operational amplifiers, and a first TC buffer 183 for producing a range fault signal (P). The tracking means FIG. 4 further includes a first leading comparator resistor R101 connected to the output of the first TC operational amplifier 176, a leading comparator 56 operational amplifier 184 with non-inverting input connected to the first leading comparator resistor R101 and inverting input connected to a voltage divider comprising second R103 and third R104 leading comparator resistors and a fourth leading comparator resistor connected R102 to the non-inverting input as feedback, a second TC inverter 186 connected to the output of the leading comparator operational amplifier 184, a first TC AND gate 188 which receives the output from the second TC inverter 186 and the enabled tracking signal (J), a first base resistor R105 connected to the output of the first TC operational amplifier 176, a base operational amplifier 190 with non-inverting input connected to the first base resistor R105 and inverting input connected to a voltage divider comprising second R107 and third R108 base resistors and a fourth base RI06 resistor as feedback, a third TC 192 inverter connected to the output of the base operational amplifier 190, a first lagging comparator resistor R111 connected to the output of the first TC operational amplifier 176, a lagging comparator 60 operational amplifier 194 with noninverting input connected to the first lagging comparator resistor R111 and the inverting input connected to a voltage divider comprising a second R113 and third R112 lagging comparator resistors and a fourth lagging comparator resistor R112 as feedback, a fourth TC inverter 196 connected to the output if the lagging comparator operational amplifier 194, a second TC AND gate 198 for receiving the output of the first TC AND gate 188 and the third TC inverter and the fourth TC inverter 196 for producing a positive adjustment signal (Q), a fifth TC inverter 200 and first TC LED 201 and first TC limiting resistor RI09 connected in series to the output of the second TC AND gate 198 for indicating the presence of the positive adjustment signal (Q), a third TC AND gate 202 with the inputs connected to the base operational amplifier 190 and the fourth TC inverter 196, a second TC OR gate 204 with the inputs connected to the complemented enable spacing signal (I) and the output of the leading comparator operational amplifier 184 and the output of the third AND gate 202 for producing a base speed signal (R), a sixth TC inverter 206 in series with a second TC LED 207 and in series with a second TC limiting resistor R110 connected to the power supply for indicating the presence of the base speed signal (R), a fourth TC AND gate 208 with inputs connected to the first TC AND gate 188 and the lagging comparator operational amplifier 194 for providing a negative adjustment signal (S), a seventh TC inverter 210 in series with a third TC LED 214 in series with a third TC limiting resistor R115 in series with power source for indicating the presence of the negative adjustment signal (S), a first que resistor R116 connected to the output of the first TC operational amplifier 176, a que operational amplifier 212 with non-inverting input connected to the first que resistor R116 and inverting input connected to a voltage divider comprising second R118 and third R119 que resistors and a fourth R117 que resistor connected to the non-inverting input as feedback, a fifth que resistor R120 connected to ground and to a voltage supply through a switch 214, an eighth inverter 216 connected to the fifth que resistor R120, a fifth TC AND gate 218 with inputs connected to the In Que input signal (C) and the fifth que resistor R120, a sixth TC AND gate 220 with inputs connected to the que operational amplifier 212 and the eighth TC inverter 216, a third TC OR gate 222 with inputs connected to the fifth TC AND gate 218 and the sixth TC AND gate 220 for producing a stopping signal (T), a fourth TC LED 221 and fourth TC limiting resistor R121 in series for indicating the presence of the stopping signal (T), a decell operational amplifier 224 with noninverting input connected to the output of the first TC operational amplifier 176 and inverting input connected to a voltage divider comprising a first R124 and second R125 decell resistor and a third decel1 resistor R123 connected to the non-inverting input as feedback, a seventh TC AND gate 226 for receiving the complemented enable spacing signal (I) and the output from the decell operational amplifier 224 and the deceleration enabled signal (0), a decel2 operational amplifier 228 with non-inverting input connected to the first TC operational amplifier 176 and inverting input connected to a voltage divider comprising a first R129 and second R130 decel2 resistors and third decel2 resistor R128 connected to the non-inverting input as feedback, an eighth TC AND gate 230 producing the DECEL1 signal (U) with inputs connected to the deceleration enable signal (0) and the complemented enable spacing signal (I) and the output of the decel2 operational amplifier 228, a ninth TC inverter 231 connected to the output of the eighth TC AND gate 230, a ninth TC AND gate 232 producing the DECEL2 signal (Y) with inputs connected to the outputs from the seventh 226 TC AND gates and the ninth inverter 231 to produce a DECEL1 signal, a fourth TC OR gate 234 with inputs connected to the output of the eighth 232 and the ninth 230 TC AND gates, a tenth TC inverter 236 connected to the output of the fourth TC OR gate 234 for producing a NO DECEL signal (W), the eighth AND gate 232 produces the decel2 signal, an eleventh TC inverter 238 connected to the output of the seventh TC AND gate 226 and a fifth TC LED 239 connected to the eleventh TC inverter 238 and a fourth TC limiting resistor R126 connected to the fifth TC LED 238 and the voltage supply for DECEL1 signal (U) indication, a sixth TC LED 240 connected to the output of the ninth TC inverter 231 and a sixth TC limiting resistor R131 connected to the sixth TC LED 240 and the voltage supply for DECEL2 signal indication.

The first adjustment means 68 includes a pair of first 242 and second 243 adjustment switches connected between the speed select signals from the digital-to-analog convertor 118 and the analog rectifier means 90, a first adjustment resistor R16 connected to ground and to the analog-digital switch 104 to voltage supply for turning ON to represent digital mode selection and turning OFF to represent analog mode selection, a first adjustment inverter 244 interconnecting the first adjustment resistor R16 and the first adjustment switch 242, a first adjustment op-amp 246 for receiving the single output of the first or second switch 243, a second adjustment operational amplifier 248 with inverting input connected to the output 246 of the first adjustment op-amp and a second adjustment resistor R12 connected to ground and the non-inverting input and a third adjustment resistor R13 connected to the second adjustment resistor R12 as feedback, a fourth adjustment switch 250 connected to the output of the second adjustment operational amplifier 248 controlled by the positive adjustment signal (Q) of the tracking means FIG. 4 for closing the switch 250 to decrease the speed, a fourth adjustment resistor R14 connected to the output of the first adjustment op-amp 246, a third adjustment operational amplifier 252 with non-inverting input connected to the fourth adjustment resistor R14 and a fifth adjustment resistor R15 as a voltage divider connected to the non-inverting input and unity gain feedback, a fifth adjustment switch 254 for receiving a control signal from the negative adjustment signal (S) of the tracking means FIG. 4 for closing the fifth adjustment switch 254 when the speed has to be increased, a sixth adjustment switch 256 connected to the output of the first op-amp 246 for receiving a control signal from the base speed signal (R) for closing the switch 256 when no change in speed is necessary wherein a servo command signal is provided by the closing of either the fourth 250, fifth 254 or sixth 256 adjustment switches.

The deceleration enable comparator means 70 includes a first deceleration enable resistor R18 connected to the output of the first adjustment means 68, a deceleration enable operational amplifier 258 with non-inverting input connected to the first deceleration enable resistor R18, a second deceleration enable resistor R17 connected as feedback to the non-inverting input, and a third R19 and fourth R20 deceleration enable resistor as a voltage divider connected to the inverting input wherein the output of the deceleration enable op-amp 258 produces the deceleration enable signal (0).

The second adjustment means 72 includes a sixth adjustment resistor R139 connected to the first adjusted signal (B) from the first adjustment means 68, a seventh adjustment resistor R140 connected to the sixth adjustment resistor R139 and ground, a seventh adjustment switch 260 controlled by the DECEL1 signal (U) of the first deceleration means 64 to the close when a first predetermined ratio is required, an eighth adjustment resistor R141 connected to the input of the servo command signal by a jumper 262, a ninth adjustment resistor R142 connected to the eighth adjustment resistor R141 and ground, an eighth adjustment switch 264 connected to the eighth adjustment resistor R1 controlled by the DECEL2 signal (Y) of the second deceleration means 66 for closing when a second predetermined ratio is required and a jumper 262 between a voltage supply and the servo input to manually select whether the vehicle 12 is to slow by the second predetermined percentage or to a fixed speed, a ninth adjustment switch 266 connected to the input of the servo command signal controlled by the NO-DECEL signal (W) of the third deceleration comparator 67 to close when a change in speed is not required wherein the output of the seventh 260, eighth 264, and ninth 266 adjustment switches are connected to form a single output.

The manual operation means 74 is controlled by a jog forward terminal 77 and jog backward 79 terminal wherein to specify either, the terminal 77, 79 is tied to ground. The manual operation means 74 includes a first operation resistor connected to the jog forward terminal 77, a first operation capacitor C18 connected to the same terminal 77, a first operation inverter 271 connected to the common points, a second operation resistor R9 connected to the jog reverse terminal 79, a second operation capacitor C19 connected to the same terminal 79, and second operation inverter 272 connected to the common point, an operation OR gate 274 having inputs connected to the first 271 and second 272 operation inverter's outputs, a third operation inverter 276, an operation AND gate 278 having an input connected to the third inverter 276, a third operation resistor R10 connected to ground, a fourth operation resistor R11 connected to the voltage supply, a first operation switch 280 connected to the third R10 and fourth R11 operation resistors controlled by the output of the operation OR gate 274 which activates a control line, the manual operation switch 76 connected to ground, a fifth resistor R80 connected to voltage supply and the manual operation switch 76, a third operation capacitor C10 connected between ground and the manual operation switch 76, a fourth operation inverter 284 connected to the common point, a fifth operation inverter 285 connected to the fourth operation inverter 284 and an input to the AND gate 278 wherein the other inputs to the AND gate 278 are tied to the voltage supply, a second operation switch 186 connected to the control line controlled by the output of the AND gate 278 to tie the switch 286 to ground, a third operation switch 288 connected to the output of the second adjustment means 72 controlled by the fourth operation inverter 284 to connect it to the control line.

The in que integration means 78 uses an input from the control line in the manual operation means 74. The in que integration includes an integration switch 290 connected to the control line controlled by the in que input signal (T), a first integration inverter 294 connected to the in que signal (T), a second integration inverter 296 connected to the first integration inverter 294 for indicating in que presence, a second integration switch 298 controlled by the output of the first integration inverter 294 and connected to ground, a first integration operational amplifier 292 with noninverting input connected to the first 290 and second 298 integration switches and inverting input as unity gain feedback, an integration resistor R143 connected to the output of the first integration amplifier 292 providing the drive signal 32. The command integration means 68, FIG. 2b, FIG. 4 further includes, a second integration resistor R144 connected to the first integration resistor R143, a second integration operational amplifier 300 with non-inverting input connected to the second integration resistor R144 and inverting input connected to voltage divider comprising of a third R146 and fourth R147 integration resistors and fifth integration resistor R145 non-inverting input as feedback, a drive LED 302 and a sixth integration resistor R148 in series to ground connected to the output of the second integration operational amplifier 300 for command indication.

The motor monitor means 82 includes a first monitor resistor R149 connected to the motor monitor input signal 47, a first monitor diode D28 connected to the first monitor resistor R149 and ground, a first monitor capacitor C15 connected in parallel with the first monitor diode D28, a second monitor resistor R150 connected to the first monitor resistor R149, a monitor operational amplifier 304 with the non-inverting input connected to the second monitor resistor R150 and the inverting input connected to a voltage divider comprising a third R152 and fourth R153 monitor resistors and a fifth monitor resistor R151 connected to the non-inverting input as feedback, a first monitor inverter 306 connected to the output of the monitor operational amplifier 304, a ramp LED 305 and ramp resistor R154 connected to the voltage supply and the first monitor inverter 306 for ramping indication.

The timer means 84 includes a timer switch 307 connected to the output of the monitor operational amplifier 304, a first timer resistor R156 connected to the timer switch 307, a second timer resistor R157 connected to the first timer resistor and the voltage supply, a first timer capacitor C16 connected to the first timer resistor R156 and ground, a third timer resistor R161 connected to the first timer capacitor C16, a timer operational amplifier 308 with inverting input connected to the third timer resistor R161 and the voltage divider comprising of fourth R158 and fifth R159 timer resistors connected to the non-inverting input and a sixth timer resistor R160 connected to the non-inverting input as feedback. A dwell AND gate 309 has its inputs connected to the monitor inverter 306 and the output of the timer operational amplifier 308 and a dwell resistor R155 is connected in series to a dwell LED 310 connected to the dwell AND gate 309 for dwell indication.

The brake means 80 includes a chip 312 for receiving the input of the run signal 36, a first brake resistor R164 connected to the output of the chip 312, a triac 313 connected to first brake resistor R164 and the gate connected to the chip 312, a second brake resistor R165 connected to the first brake resistor R164 and the triac 313, a brake capacitor C17 connected to the second brake resistor R165 and the triac 313 wherein the brake relay is driven by the triac 313.

The failure protection means 86 includes a failure AND gate 314 with inputs connected to the trip input signal (M) and the range fault signal (P) and the command fault signal (N) with respective LED's 350, 352 and the overload signal (D), an first overload resistor R162 connected to the voltage supply and an overload LED 316 and the input of the overload signal (D) for temperature over load indication, a failure resistor R83 and failure capacitor C11 connected to the output of the failure AND gate 314 and ground, a second failure inverter 317 connected between the failure capacitor C11 and resistor R83, a third failure inverter 319 connected to the second failure inverter.

The signal control means 87 includes a control OR gate 320 with inputs from the drive signal 32 from the second integration op-amp 300, the monitor op-amp 304, and the timer op-amp 308. A control AND gate 322 receives input from the control OR gate 320 and the third failure inverter 319 of the failure protection means 86. A control inverter 323 is connected to the output of the control AND gate 322 and a control LED 324 and control resistor R166 are connected to the power supply and the control inverter 323 for run indication wherein the output of the control inverter 323 is a run signal 36.

The system reversing means 88 includes the digital switch 102 for selecting control through the second 25, 100, FIG. 7 or third 122, FIG. 7 embodiments. If control is through the first embodiment 90, the switch 102 will be open. The system reversing means 88 incorporates all of the reversing signals from the three embodiments 25, 100, 122, FIG. 7 to produce a single reverse signal. The circuitry includes a first reversing circuit resistor R28 connected between the digital switch 102 and ground, the select inverter 154 connected to the first reversing circuit resistor R28, a first reversing circuit AND gate 326 for receiving the analog reversing signal and the output of the select inverter 154, a second reversing circuit AND gate 328 for receiving the digital input reversing signal (M) and the signal from the digital switch 102, a first reversing circuit inverter 329 receiving the complemented reversing signal (L) from the decoding means FIG. 7, a first reversing circuit OR gate 330 for receiving the outputs of the first 326 and the second 328 reversing circuits AND gates and the first reversing circuit inverter 329, a third reversing circuit AND gate 332 receives inputs from the analog reversing signal and the output of the first adjustment inverter 244 of the first adjustment means 68, a fourth reversing AND gate 333 with inputs connected to the first adjustment resistor R16 and to the output of the first reversing circuit OR gate 330, a second reversing circuit OR gate 334 with inputs connected to the outputs of the third 332 and fourth 333 reversing circuit AND gates, a third reversing circuit OR gate 335 with inputs connected to the output of the third reversing circuit OR gate 334 and the output of the second operation inverter 272 of the manual operation means 74, a second reversing circuit inverter 336 connected to the output of the third reversing circuit OR gate 335, a reversing LED 337 connected to the second reversing circuit inverter 336 and a power supply, wherein the output of the second reversing inverter 236 produces the reversing signal 90 to the motor 14.

The following are values for the various components which may be used in a circuit made in accordance with the subject invention, it is to be understood that the values are exemplary and various combinations of value may be used in the various components utilized in practicing the invention.

LIST OF COMPONENTS
RESISTORS
(value in ohms)

| Component # | Value | Component # | Value |
| --- | --- | --- | --- |
| R1 | 14K | R85 | 10K |
| R2 | 10K | R86 | 100K |
| R3 | 100K | R87 | 18K |
| R4 | 1K | R88 | 100 |
| R5 | 10K | R89 | 12K |
| R6 | 10K | R90 | 4.7K |
| R7 | 6.8K | R91 | 500 |
| R8 | 10K | R92 | 100K |
| R9 | 10K | R93 | 100K |
| R10 | 10K | R94 | 900K |
| R11 | 100K | R95 | 900K |
| R12 | 100K | R96 | 1M |
| R13 | 10K | R97 | 1M |
| R14 | 11K | R98 | 100K |
| R15 | 100K | R99 | 10K |
| R16 | 10K | R100 | 78.7K |
| R17 | 10M | R101 | 10K |
| R18 | 10K | R102 | 10M |
| R19 | 11.5K | R103 | 10K |
| R20 | 71.5K | R104 | 2.7K |
| R21 | 10M | R105 | 10K |
| R22 | 71.5K | R106 | 10M |
| R23 | 11.5K | R107 | 10K |
| R24 | 470K | R108 | 10K |
| R25 | 13K | R109 | 4.7K |
| R26 | 10M | R110 | 4.7K |
| R27 | 10K | R111 | 10K |
| R28 | 10K | R112 | 10M |
| R29 | 4.7K | R113 | 10K |
| R30 | 10K | R114 | 8K |
| R31 | 10K | R115 | 4.7K |
| R32 | 10K | R116 | 10K |
| R33 | 10K | R117 | 10M |
| R34 | 10K | R118 | 10K |
| R35 | 10K | R119 | 82K |
| R36 | 10K | R120 | 10K |
| R37 | 10M | R121 | 4.7K |
| R38 | 10M | R122 | 10K |
| R39 | 10M | R123 | 10M |
| R40 | 10M | R124 | 10K |
| R41 | 10M | R125 | 3K |
| R42 | 10M | R126 | 4.7K |
| R43 | 10M | R128 | 10M |
| R44 | 7.07K | R129 | 10K |
| R45 | 1200 | R130 | 18.5K |
| R46 | 1200 | R131 | 4.7K |
| R47 | 1200 | R132 | 10K |
| R48 | 1200 | R133 | 10M |
| R49 | 1200 | R134 | 78.7K |
| R50 | 1200 | R135 | 11.3K |
| R51 | 3K | R137 | 12.4K |
| R52 | 1K | R138 | 63.4 |
| R53 | 1K | R139 | 100K |
| R54 | 1K | R140 | 100K |
| R55 | 1K | R141 | 1M |
| R56 | 1K | R142 | 100K |
| R57 | 1K | R143 | 220K |
| R58 | 1K | R144 | 10K |
| R59 | 10K | R145 | 10M |
| R60 | 10K | R146 | 330K |
| R61 | 10K | R147 | 11K |
| R62 | 10K | R148 | 4.7K |
| R63 | 10K | R149 | 1K |
| R64 | 10K | R150 | 10K |
| R65 | 10K | R151 | 10M |
| R66 | 5K | R152 | 1.2M |
| R67 | 5K | R153 | 18K |
| R68 |  | R154 | 4.7K |
| R69 | 10K | R155 | 4.7K |
| R70 |  | R156 | 220 |
| R71 | ? | R157 | 200K |
| R72 |  | R158 | 15K |
| R73 |  | R159 | 27K |
| R74 | 6.2K | R160 | 10M |
| R75 | 12K | R161 | 1K |
| R76 | 12K | R162 | 4.7K |
| R77 | 6.2K | R163 | 470 |
| R78 | 12K | R164 | 180 |
| R79 | 12K | R165 | 4.7K |
| R80 | 10K | R166 | 4.7K |
| R81 | 4.7K | R167 | 10K |
| R82 | 4.7K | R168 | 10K |
| R84 | 1K |  |  |

CAPACITORS
(value in farads)

| Component # | Value | Component # | Value |
| --- | --- | --- | --- |
| C1 | 1u | C10 | .1u |
| C2 | .1u | C11 | 2.2u |
| C3 | .1u | C12 | .1u |
| C4 | .1u | C13 | 2.2n |
| C5 | 10n | C14 | 2.2n |
| C6 | 2.2u | C15 | 2.2n |
| C7 | 2.2u | C16 | 4.7u |
| C8 | 2.2u | C17 | .1u |
| C9 | 2.2u |  |  |

DIODES

| Component # | Value | Component # | Value |
| --- | --- | --- | --- |
| D1 | IN 4148 | D10 | IN 4148 |
| D2 | IN 4148 | D12 | IN 4004 |
| D3 | IN 4148 | D13 | IN 4148 |
| D4 | IN 4148 | D15 | IN 4004 |
| D5 | IN 4148 | D16 | IN 4148 |
| D6 | IN 4004 | D19 | IN 4148 |
| D7 | IN 4148 | D20 | IN 4005 |
| D9 | IN 4004 | D22-70 | IN 4148 |

INTEGRATED CIRCUIT CHIPS

| Reference # | Type |
| --- | --- |
| 158, 164 | HT32 |
| 244, 245, 340, 341, 342, 343 | 4N207 |
| 108 | 4019 |
| 112 | 4051 |
| 114 | 4028 |
| 118 | DAC08 |

| | |
|---|---|
| 144 | 4532 |
| 156 | 4078 |
| 204, 320, 330 | 4075 |
| 182, 222, 234, 274, 335, 334 | 4071 |
| 188, 202, 208, 218, 220, 232, 309, 322, 326, 328, 332, 333 | 4081 |
| 278, 314 | 4082 |
| 198, 226, 230 | 4073 |
| 296, 323, 336 | ULN2004A |
| 312 | NOC3040 |
| 160, 162, 166, 168, 170, 172, 174, 271, 272, 276, 284, 285 | 4584 |
| 154, 329, 306, 319, 294, 244, 183, 200, 206, 210, 236, 231, 216, 196, 192, 186 | 4069 |
| Switches | 4066 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A conveyor control assembly including a trolley vehicle (12) which moves along rails (20), wherein said vehicle (12) is powered from rail voltages (18), said assembly comprising: a vehicle (12) including wheels (16) for mobility, a variable speed motor (14) within said vehicle (12) for rotating said wheels (16); a plurality of rails for supporting said vehicle (12); said plurality of rails including power rails (18) for supplying power to said motor (14); said assembly characterized by said plurality of rails (20) including at least one command rail for producing an analog command signal along said command rail (20) indicative of requested speed which represents one of a plurality of speeds, the command signal having a first magnitude range indicative of requested speed in a forward direction wherein requested speed is represented by the magnitude of said analog command signal within said first magnitude range and a second magnitude range indicative of requested speed in a reverse direction wherein the requested speed is represented by the magnitude of said analog command signal within said second magnitude range, and control means (22) within said vehicle (12) for receiving said analog command signal and interpreting it to drive said motor (14) to move said vehicle (12) at said requested speed in one of said forward direction and reverse direction.

2. An assembly as set forth in claim 1 further characterized by said command rail (20) comprising a plurality of isolated sections of rail (20) for providing one of said command signals on each of said sections of rail (20) and isolated from said command signal on the next adjacent section.

3. An assembly as set forth in claim 2 further including generating means (26) for supplying said command signals on said isolated sections of rail (20) to move said vehicle (12) at various speeds wherein said command signal represents one of the various speeds providing said requested speed which drives said motor (14) at various speeds dependent upon which of said separated sections of rail (20) said vehicle (12) is within.

4. An assembly as set forth in claim 2 further characterized by including generating means (26) for supplying a command signal on said isolated sections of rail (20) to move said vehicle (12) at various speeds wherein said command signal represents one of said various speeds providing said requested speed which drives the motor (14) at various speeds and which includes a plurality of reverse and forward directional speeds for moving said vehicle (12) in the reverse and forward directions along said plurality of rails (20) at one of said plurality of requested speeds.

5. An assembly as set forth in claim 4 further characterized by said power supply rails (18) including three rails for supplying a three-phase power to said motor (14), wherein each of said three rails (18) carries a power supply voltage having one phase.

6. An assembly as set forth in claim 5 further characterized by said control means (22) including speed select means for receiving and interrupting said command signal from said isolated section of rail (20) along which said vehicle (12) is travelling to produce a speed select signal representative of said requested speed to drive said motor (14).

7. An assembly as set forth in claim 6 further characterized by said speed select means (25) including analog rectifier means (96) for separating the positive and negative command signal producing said speed select signal.

8. An assembly as set forth in claim 7 further characterized by said speed select means (25) including analog reversing means (99) for receiving said negative command signal and supplying to said reversing means (88).

9. An assembly as set forth in claim 8 further characterized by said speed select means (25) including analog fault means (98) for actuating said failure protection means (86) when said speed select signal is below a predetermined allowance.

10. An assembly as set forth in claim 9 further characterized by said speed select means (25) including converting means for converting said analog command signal into a three bit code (B1, B2, B3) representative of said requested speed.

11. An assembly set forth in claim 10 further characterized by said speed select means (92) including decoding means for decoding said three bit code (B1, B2, B3) to produce said speed select signal (X) representative of requested speed.

12. An assembly as set forth in claim 11 further characterized by said decoding means including multiplexing means (108) for receiving said three bit code (B1, B2, B3).

13. An assembly as set forth in claim 12 further characterized by said decoding means including display means (110) for visually displaying said selected speed in response to said multiplexing means (108).

14. An assembly as set forth in claim 13 further characterized by said decoding means including binary to decimal decoder (114) for transposing the output of said multiplexing means (108) into a seven bit binary signal.

15. An assembly as set forth in claim 14 further characterized by said decoding means including speed switch means (116) for determining the speed associated with each of said seven bit binary signals.

16. An assembly as set forth in claim 15 further characterized by said decoding means including digital to analog converter (118) for producing said speed select signal (X) in response to said speed switch means (116).

17. An assembly as set forth in claim 16 further characterized by said decoding means including analog multiplexer means (112) for changing said three bit binary code into said speed select signal (X).

18. An assembly as set forth in claim 6 further characterized by said control means (22) including override means for overriding and changing said speed select signal to drive said motor (14).

19. As assembly as set forth in claim 18 further characterized by said override means including command integration means for adjusting said command signal to adjust the speed of said vehicle (12) to produce a drive signal (32) to said motor (14).

20. An assembly as set forth in claim 19 further characterized by said override means including run integration means for turning on and off said motor (14) responsive to said drive signal (32) of said command integration means.

21. A method of moving a trolley vehicle (12) along rails (20) driven by a variable speed motor (14) powered from rail voltages (18), said method including the steps of; transmitting a command signal indicative of a requested speed on a rail, receiving the command signal from the rail and interpreting it to drive the motor (14) to move the vehicle (12) at the requested speed, sensing a first condition external the vehicle and a second condition of the vehicle, and overriding and changing the received requested speed signal to drive the motor decelerating the vehicle to a decrease speed greater than zero in response to said first condition and stopping the vehicle in response to said second condition while maintaining the command signal indicative of the requested speed transmitted on the rail.

22. A method as set forth in claim 21 further including isolating sections of the rails (20) for providing a command signal on each section and isolated from the command signal on the next adjacent section for moving the vehicle (12) at different speeds.

23. A method as set forth in claim 22 further including generating the command signal on the isolated sections of the rails (20) to move the vehicle (12) at various speeds.

24. A method as set forth in claim 23 by the including receiving and interpreting the command signal to produce a speed select signal representative of the requested speed to drive the motor (14).

25. A method as set forth in claim 24 by including adjusting the command signal to adjust the speed of the vehicle (12) to produce a drive signal (32) to the motor (14), and turning on and off the motor (14) responsive to the drive signal (32).

26. A method as set forth in claim 25 further including preventing less than a minimum distance between the vehicle (12) and an adjacent vehicle establishing the first condition by one of slowing the vehicle by a predetermined percentage and slowing the vehicle to a predetermined speed, and by stopping the vehicle when the distance is below a predetermined limit establishing the second condition.

27. A method as set forth in claim 26 further including stopping the vehicle in response to a failure in the controlling.

28. A method as set forth in claim 27 further including generating an analog command signal on one command rail (20) with a magnitude indicative of the requested speed.

29. A conveyor control assembly including a subject vehicle (12) which moves along rails (20), wherein said subject vehicle (12) is powered from rail voltages and include a variable speed motor (14) for moving the vehicle (12), said assembly comprising; control means (22) within the subject vehicle (12) for receiving a command signal transmitted along a rail indicative of requested speed and interpreting it to drive the motor (14) to move the subject vehicle (12) at the requested speed, said control means (22) including sensor input means (38, 40, 47) for sensing a first condition and second condition of activity, and override means for overriding and changing the received requested speed signal to decelerate the subject vehicle to a decreased speed in said first condition and to stop in said second condition in response to said sensor input means (38, 40, 47) while preventing change of the command signal on the rail.

30. An assembly as set forth in claim 29 further characterized by said control means (22) including speed select means for receiving and interpreting said command signal to produce a speed select signal representative of said requested speed to drive said motor (14).

31. An assembly as set forth in claim 30 further characterized by said override means including command integration means for adjusting said command signal to adjust the speed of the subject vehicle (12) to produce a drive signal (32) to said motor (14).

32. An assembly as set forth in claim 31 further characterized by said override means including run integration means for turning on and off said motor (14) responsive to said drive signal (32) of said command integration means.

33. An assembly as set forth in claim 32 further characterized by said command integration means including tracking means for preventing less than a minimum distance between said vehicle (12) and an adjacent vehicle by controlling the subject command integration means.

34. An assembly as set forth in claim 33 further characterized by said tracking means including a range sensor (40) for measuring the distance to an adjacent vehicle.

35. An assembly as set forth in claim 34 further characterized by said tracking means including a range fault means (54) for stopping the subject vehicle (12) when the input of said range sensor (40) is below a predetermined limit.

36. An assembly as set forth in claim 35 further characterized by said run integration means including failure protection means (86) for stopping said vehicle (12) in response to a failure in said control means (22).

37. An assembly as set forth in claim 36 further characterized by said run integration means including brake means for stopping the subject vehicle (12) in response to said command integration means and said run integration means.

38. An assembly as set forth in claim 37 further characterized by said run integration means including motor monitor means (82) for actuating said brake means (80) when the speed of said motor (14) falls below a predetermined speed.

39. An assembly as set forth in claim 38 further characterized by said run integration means including timer means (84) for delaying the turning off of said motor (14) in response to said motor monitor means.

40. An assembly as set forth in claim 39 further characterized by said input means including in que input (44) producing an in que signal (C) for short distance sensing, trip input (42) producing a trip input signal (M) for sensing overheating by over driving, and overload input (46) producing an overload input signal (D) for sensing overheating of said motor (14).

41. An assembly as set forth in claim 40 further characterized by said control means (22) including reversing means (88) for receiving said command signal and producing a reversing signal.

42. An assembly as set forth in claim 41 further characterized by said command integration means including adjustment means for adjusting said requested speed in response to said tracking means.

43. An assembly as set forth in claim 42 further characterized by said command integration means including manual operation means (74) for jogging said vehicle (12) forwards and backwards in response to grounding specified input terminals.

44. An assembly as set forth in claim 43 further characterized by said command integration means including in que integration means (78) for changing the output of said second adjustment mean in response to said in que input (44) producing said drive signal (32).

45. An assembly as set forth in claim 44 further characterized by said run integration means including signal control means (22) for turning OFF said motor (14) in response to said failure protection means (86) and said timer means (84) and said drive signal (32).

46. An assembly as set forth in claim 45 further characterized by said tracking means including deceleration means (52) for slowing the subject vehicle (12) when the subject vehicle (12) senses another adjacent vehicle (12) within at least one forward predetermined distance.

47. An assembly as set forth in claim 46 further characterized by said command integration means including stopping means (63) for producing stop signal (T) and for stopping the subject vehicle (12) when another adjacent vehicle is sensed within a stop distance, which is less than said forward predetermined distance.

48. An assembly as set forth in claim 47 further characterized by said stopping means including an que comparator (62) for receiving said range input (40) and stopping the subject vehicle (12).

49. An assembly as set forth in claim 48 further characterized by said deceleration means (52) including a first deceleration comparator (64) for receiving the subject range input to slow said vehicle (12) when within a first forward predetermined distance in the absence of activation of said spacing means (50).

50. An assembly as set forth in claim 49 further characterized by said deceleration means (52) including a second deceleration comparator (66) for receiving the subject range input to slow said vehicle (12) when within a second forward predetermined distance.

51. An assembly as set forth in claim 50 further characterized by said deceleration means (52) including a deceleration gate means (67) for allowing the subject vehicle (12) to move at said requested speed in the absence of a change in the speed.

52. An assembly as set forth in claim 51 further characterized by said control integration means including deceleration enable means (70) for activating said deceleration means in response to said adjustment means (68, 72).

53. An assembly as set forth in claim 52 further characterized by said tracking means (FIG. 4) including spacing means (50) for maintaining a predetermined distance between the subject vehicle (12) and a adjacent trailing vehicle so that the subject vehicle will run at said requested speed and the adjacent trailing vehicle will vary its speed to maintain said predetermined distance.

54. An assembly as set forth in claim 53 further characterized by said spacing means (50) including leading comparator (56) means for receiving the subject range input signal to slow said vehicle (12) by a programmed percentage.

55. An assembly as set forth in claim 54 further characterized by said spacing means (50) including base comparator (58) means for indicating lack of presence of other vehicles (12) and to run at said requested speed.

56. An assembly as set forth in claim 55 further characterized by said spacing means (50) including lagging comparator (60) means for receiving said range input signal to increase the speed of the subject vehicle (12).

57. An assembly as set forth in claim 56 further characterized by said adjustment means including first adjustment means (68) for adjusting said requested speed in response to said spacing means (50) producing a first adjusted signal, wherein said deceleration enable means (70) is responsive to said first adjustment means (68).

58. An assembly as set forth in claim 57 further characterized by said command integration means including second adjustment means (72) for adjusting said first adjusted signal in response to said deceleration means (52).

59. An assembly as set forth in claim 58 further characterized by said motor including an inverter (24) for driving said motor from said control means (22).

60. An assembly as set forth in claim 30 further characterized by said generating means (26) generating an analog command signal sent on said command rail (20) with a magnitude indicative of said requested speed.

61. An assembly as set forth in claim 29 further characterized by said control means (22) including speed select means for receiving and interpreting said command signal to produce a speed select signal representative of said requested speed to drive said motor (14).

62. An assembly as set forth in claim 29 further characterized by said override means including tracking means for decreasing the requested speed to the decreased speed to prevent less than a minimum distance between the vehicle and a second vehicle establishing said first condition, and for stopping the vehicle to prevent the distance to a second vehicle from the less than a predetermined limit establishing said second condition.

63. A method of moving a trolley vehicle (12) along rails (20) driven by a variable speed motor (14) powered from rail voltage (18), said method including the steps of; supplying power along power rails (18) to power the motor (14) of the vehicle, producing an analog command signal on a command rail (20) having a first magnitude range indicative of requested speed in a forward direction and a second magnitude range indicative of requested speed in a reverse direction wherein the analog command signal represents one of a plurality of various speeds and the magnitude of the analog command signal within the respective ranges indicates the requested speed, and receiving and interpreting the analog command signal to drive the motor (14) to move the vehicle (12) at the requested speed in one of the forward direction and reverse direction.

64. A method as set forth in claim 63 further including the command signal having positive polarity indicating forward direction and having negative polarity indicating reverse direction.

65. A method as set forth in claim 64 further including rectifying and separating the positive and negative signal producing a speed select signal having representative of said requested speed to drive the motor (14).

66. A conveyor control assembly including a vehicle (12) which moves along rails (20), wherein said vehicle (12) receives an electrical signal from the rail (20) to drive a motor (14) to move the vehicle (12), said assembly comprising; a vehicle (12) including wheels (16) for mobility, said vehicle (12) including control means for receiving electrical command signals off the rail (20) and interpreting said signals into binary coding representing the speed at which said vehicle (12) is to move; said control means including receiving means for receiving said command signal off the rails (20), coding means for converting said command signal into binary coding, and converting means for receiving said binary coding and converting same to a speed select signal; and override means for overriding and changing said speed select signal dependent on sensed external condition to drive the motor (14).

67. An assembly as set forth in claim 66 further characterized by said overriding means including command integration means for adjusting said command signal to adjust the speed of said vehicle (12) to produce a drive signal (32) to said motor (14).

68. As assembly as set forth in claim 67 further characterized by said override mean including run integration means for turning on and off said motor (14) responsive to said drive signal (32) of said command integration means.

69. An assembly as set forth in claim 68 further characterized by said control means (22) including sensor input means (38, 40, 47) for sensing external activity, said input means including in que input (44) producing an in que signal (C) for short distance sensing, trip input (42) producing a trip input signal (M) for sensing overheating by over driving, and overload input (46) producing an overload input signal (D) for sensing overheating of said motor (14).

70. An assembly as set forth in claim 69 further characterized by said command integration means including tracking means for preventing less than a minimum distance between said vehicle (12) and an adjacent vehicle by controlling said command integration means.

71. An assembly as set forth in claim 70 further characterized by said tracking means including a range sensor (40) for measuring the distance to an adjacent vehicle.

72. An assembly as set forth in claim 70 further characterized by said tracking means including range fault means (54) for stopping said vehicle (12) when the input of said range sensor (40) is below a predetermined limit.

73. An assembly as set forth in claim 72 further characterized by said control means (22) including reversing means (88) for receiving said command signal and producing a reversing signal.

74. A conveyor control assembly including a vehicle (12) which moves along rails (20), wherein said vehicle (12) receives an electrical signal from the rail (20), said assembly comprising; a vehicle (12) including wheels (16) and motor means (14) operating said wheels (16) for mobility, said vehicle (12) including control means for receiving an electrical command signal off the rail (20) and interpreting said command signal into binary coding representing the speed in which said vehicle (12) is to move; said control means including receiving means for receiving said command signal off the rails (20), coding means for converting said command signal into binary coding, and converting means for receiving said binary coding and converting same to a speed select signal to drive said motor means (14).

75. An assembly as set forth in claim 66 or 74 further characterized by said coding means including magnitude means for converting said command signal into binary coding based on the magnitude of said command signal.

76. A conveyor control assembly including a trolley vehicle (12) which moves along rails (20), wherein said vehicle (12) is powered from rail voltages, said assembly comprising: a vehicle (12) including wheels (16) and motor means (14) for operating said wheels for mobility; said vehicle (12) including control means (22) for receiving a command signal transmitted along rails indicative of requested speed and interpreting it to drive said motor means (14) to move said vehicle (12) to the requested speed; said control means (22) including speed select means for receiving and interpreting said command signal to produce a speed select signal representative of said requested speed to drive said motor means (14) and override means for overriding and changing said speed select signal to drive said motor means (14); said override means including command integration means for adjusting said command signal to adjust the speed of said vehicle (12) to produce a drive signal (32) to said motor means (14) and run integration means for turning on and off said motor means (14) in response to said drive signal (32) of said command integration means; said command integration means including tracking means for preventing less than a minimum distance between said vehicle (12) and an adjacent vehicle by controlling said command integration means; said tracking means including a range sensor (40) for measuring the distance to an adjacent vehicle and range fault means (54) for stopping said vehicle (12) when the input of said range sensor (40) is below a predetermined limit; said run integration means including failure protection means (86) for stopping said vehicle (12) in response to a failure in said control means (22) brake means for stopping said vehicle (12) in response to said command integration means and said run integration means and a motor monitor means (82) for actuating said brake means (80) when the speed of said motor (14) fails below a predetermined speed.

* * * * *